US007092457B1

(12) United States Patent
Chugg et al.

(10) Patent No.: US 7,092,457 B1
(45) Date of Patent: Aug. 15, 2006

(54) ADAPTIVE ITERATIVE DETECTION

(75) Inventors: Keith M. Chugg, Burbank, CA (US);
Achilleas Anastasopoulos, Ann Arbor, MI (US)

(73) Assignee: University of Southern California, Los Angeles, CA (US)

( * ) Notice: Subject to any disclaimer, the term of this patent is extended or adjusted under 35 U.S.C. 154(b) by 734 days.

(21) Appl. No.: 09/765,516

(22) Filed: Jan. 18, 2001

Related U.S. Application Data

(60) Provisional application No. 60/176,951, filed on Jan. 18, 2000.

(51) Int. Cl.
*H04L 27/14* (2006.01)
*H03D 1/00* (2006.01)

(52) U.S. Cl. ........................ 375/324; 375/340; 375/341

(58) Field of Classification Search ................ 375/316, 375/341, 324, 340, 346, 147
See application file for complete search history.

(56) References Cited

U.S. PATENT DOCUMENTS

| | | | | |
|---|---|---|---|---|
| 5,297,169 A | * | 3/1994 | Backstrom et al. | 375/231 |
| 5,442,627 A | * | 8/1995 | Viterbi et al. | 370/209 |
| 5,537,419 A | * | 7/1996 | Parr et al. | 370/350 |
| 5,596,607 A | * | 1/1997 | Larsson et al. | 375/340 |
| 5,680,419 A | * | 10/1997 | Bottomley | 375/347 |
| 5,721,745 A | * | 2/1998 | Hladik et al. | 714/755 |
| 5,721,746 A | * | 2/1998 | Hladik et al. | 714/792 |
| 5,818,876 A | * | 10/1998 | Love | 375/341 |
| 5,889,823 A | * | 3/1999 | Agazzi et al. | 375/341 |
| 5,933,462 A | * | 8/1999 | Viterbi et al. | 375/341 |
| 6,002,716 A | * | 12/1999 | Meyer et al. | 375/231 |
| 6,014,411 A | * | 1/2000 | Wang | 375/259 |
| 6,108,386 A | * | 8/2000 | Chen et al. | 375/341 |
| 6,128,346 A | * | 10/2000 | Suarez et al. | 375/254 |

OTHER PUBLICATIONS

Iterative channel estimation using soft decision feedback☐☐Sandell et al, "Iterative channel estimation using soft decision feedback",☐☐The Bridge to Global Integration. IEEE , vol. 6 ,Nov. 1998, pp. 3728-3733.☐☐*
Baccarelli et al, "Combined channel estimation and data detection using soft statistics for frequency-selective fast-fading digital links", IEEE Transactions on Communications, vol. 46, Issue: 4, Apr. 1998, pp. 424-427.☐☐*

(Continued)

*Primary Examiner*—Chieh M. Fan
*Assistant Examiner*—Jason M. Perilla
(74) *Attorney, Agent, or Firm*—Fish & Richardson P.C.

(57) ABSTRACT

A system for estimating inputs and outputs of a digital transmission system is disclosed. The system includes a receiver front-end configured to receive an observed digital signal in the digital transmission system. The system further includes forward and backward recursion elements, at least one forward channel estimator, at least one backward channel estimator, and a combiner. The forward recursion element is adapted to receive the observed digital signal, and generate a first sequence of soft information by performing a forward recursion. The forward channel estimator is adapted to receive the observed digital signal and the first sequence of soft information, and to estimate channel parameters using the first sequence of soft information. The backward recursion element is adapted to receive the observed digital signal, and generate a second sequence of soft information by performing a backward recursion. The backward channel estimator is adapted to receive the observed digital signal and the second sequence of soft information, and to estimate channel parameters using the second sequence of soft information.

19 Claims, 17 Drawing Sheets

OTHER PUBLICATIONS

Kallel et al, "Bidirectional Sequential Decoding", IEEE Transactions on Information Theory, vol. 43, Issue: 4, Jul. 1997, pp. 1319-1326.*

Chang et al, "Iterative joint sequence and channel estimation for fast time-varying intersymbol interference channels", IEEE International Conference on Gateway to Globalization, vol. 1, Jun. 1995, pp. 357-361.*

Freeman and Weiss, *On the Fixed Points of the Max-Product Algorithm*, Mitsubishi Electric Research Laboratory, TR-99-39 (Jan. 2000).

H. Meyr, et al., *Digital Communication Receivers: Synchronization, Channel Estimation and Signal Processing*, 80 (Wiley, New York 1998).

N. Wiberg, et al., *Codes and Iterative Decoding on General Graphs*, 6 European Transaction on Telecommunications, 513-525 (Sep./Oct. 1995).

Aji and McEliece, *The Generalized Distributive Law*, 46 IEEE Transactions on Information Theory, No. 2 (Mar. 2000).

Ronald A. Iltis, et al., *Bayesian Algorithms for Blind Equalization Using Parallel Adaptive Filtering* (42 IEEE Transactions on Communications, No. 2/3/4 (Feb./Mar./Apr. 1994).

Y. Zhang, M. P. Fitz, and S. B. Gelfand, *Soft Output Demodulation on Frequency-Selective Rayleigh Fading Channels using AR Channel Models*, Global Communications Conference, 327-331 (Nov. 1997).

Iltis (R. A. Iltis, *A Bayesian Maximum-Likelihood Sequence Estimation Algorithm for A Priori Unknown Channels and Symbol Timing*, 10 Journal of Selected Areas in Communication, 579-588, (Apr. 1992).

\* cited by examiner

ADAPTIVE ITERATIVE DETECTION

CROSS-REFERENCE TO RELATED APPLICATIONS

This application claims the benefit of U.S. Provisional Application Ser. No. 60/176,951, filed on Jan. 18, 2000, which is incorporated herein by reference.

BACKGROUND

This invention relates to adaptive iterative detection schemes.

To improve performance, coverage, and efficiency, modern wireless communication systems utilize digital signaling techniques. However, as these communication systems become more widespread, the problem of achieving clear reception in a noisy transmission channel becomes important. Cellular phone systems are one example of wireless communication systems and they also serve to illustrate the problems associated with such systems. For example, a typical disturbance phenomenon in a cellular phone system is known as inter-symbol interference. This interference may occur from fading, reflections, delays, or other disturbances from the cellular phone system, which typically involve mobility between the transmitter and receiver.

In digital signaling, it should be possible to extract the "correct" symbol despite the presence of interference from other symbols using error control coding. However, this task is often complicated by poor knowledge of the characteristics of the transmission channel itself. For example, it is difficult to know just how cellular phone signals are being reflected, delayed, faded, and otherwise interfered with, as the cellular phone is moved around. Therefore, poor knowledge of the channel leads to uncertainty about integrity and accuracy of the received data. Accordingly, there are many known methods and systems that attempt to estimate the parameters of a transmission channel in order to better reconstruct a transmitted signal. However, in many practical situations, perfect channel estimation is not available at the receiver. Consequently an adaptive iterative receiver may deal with the unknown, and possibly time varying parameters.

Recognizing the above-described difficulties, a new class of codes, referred to as turbo codes, has been introduced. This class of turbo codes has made signaling at power efficiencies close to the theoretical limits possible. The features of a turbo code include parallel code concatenation, non-uniform interleaving, and iterative decoding. Because turbo codes may substantially improve energy efficiency, they are attractive for use over channels that are power and/or interference limited. Furthermore, turbo codes also offer good performance over fading channels. A turbo decoder may be used to decode the turbo code. The turbo decoder may include two soft-input/soft-output (SISO) decoding modules that work together in an iterative fashion.

The SISO decoding module is the basic building block for established iterative detection (ID) techniques for a system having a network of finite state machines, or more generally, subsystems. However, performing iterative detection for systems having parametric uncertainty may be complex and difficult. Previously proposed SISO techniques are either based on an oversimplified channel model, or have complexity that grows exponentially with the observation length (or the smoothing lag).

SUMMARY

In recognition of the above, the present disclosure describes a system for estimating inputs and outputs of a digital transmission system. The system includes a receiver front-end configured to receive an observed digital signal in the digital transmission system. The system further includes forward and backward recursion elements, at least one forward channel estimator, at least one backward channel estimator, and a combiner.

The forward recursion element is adapted to receive the observed digital signal, and generate a first sequence of soft information by performing a forward recursion. The forward channel estimator is adapted to receive the observed digital signal and the first sequence of soft information, and to estimate channel parameters using the first sequence of soft information. The backward recursion element is adapted to receive the observed digital signal, and generate a second sequence of soft information by performing a backward recursion. The backward channel estimator is adapted to receive the observed digital signal and the second sequence of soft information, and to estimate channel parameters using the second sequence of soft information.

The combiner is configured to compute a transitional information that ties forward and backward estimates of the first and second sequences of soft information together. Soft information on the inputs and outputs of the transmission system is then generated by combining updated first and second sequences of soft information and the transitional information.

The present disclosure also describes an iterative receiver system. The receiver system includes a channel processor, a soft-in/soft-out decoder, and an interleaver/de-interleaver pair.

The channel processor is configured to receive a plurality of coded symbols, and to produce and update soft information on the plurality of coded symbols. The channel processor is activated by updated soft information on interleaved code symbols. The soft-in/soft-out decoder is configured to receive the soft-information on the plurality of coded symbols, and to compute soft information on the coded symbols. The interleaver/de-interleaver pair operates to pass the soft information to/from the channel processor from/to the soft-in/soft-out decoder. After several iterations, final bit decisions are made on uncoded bits by the soft-in/soft-out decoder by thresholding the corresponding soft information produced by the soft-in/soft-out decoder.

The present disclosure further describes a method for estimating inputs and outputs of a digital transmission system. The method includes receiving an observed digital signal in the digital transmission system, generating a first sequence of soft information by performing a forward recursion, and estimating channel parameters using the first sequence of soft information and the observed digital signal. The method also includes generating a second sequence of soft information by performing a backward recursion, and estimating channel parameters using the second sequence of soft information and the observed digital signal. A transitional information that ties forward and backward estimates of the first and second sequences of soft information together is computed. Soft information on the inputs and outputs of the transmission system is generated by combining updated first and second sequences of soft information and the transitional information.

DESCRIPTION OF DRAWINGS

These and other features and advantages of the invention will become more apparent upon reading the following detailed description and upon reference to the accompanying drawings.

DETAILED DESCRIPTION

In recognition of the above-described difficulties with prior iterative detection systems, the present disclosure, in one aspect, describes an adaptive iterative detection system based on adaptive soft-input/soft-output (A-SISO) techniques. The expressions for the soft metrics in the presence of parametric uncertainty modeled as a Gauss-Markov process are derived in a way that enables the decoupling of complexity and observation length. Starting from these expressions, a family of sub-optimal (i.e. practical) techniques is presented based on forward/backward adaptive processing with linear complexity in N. A-SISO techniques, as well as existing adaptive hard-decision techniques are interpreted as special cases within this framework. Using a representative application, several design options are compared and the impact of parametric uncertainty on previously established results for ID with perfect channel state information is assessed. The representative application may include joint iterative equalization-decoding for trellis-based codes over frequency-selective channels, and channel estimation in turbo-coded systems.

Introduction

The present disclosure presents iterative detection (ID) schemes for systems including multiple finite state machines (FSMs). An iterative detection algorithm may be loosely defined as the set of rules to exchange, combine, and marginalize some sort of soft information related to the FSM input/output symbols, with the purpose of providing reliable decisions about the input sequence. Applications that utilize this scheme include turbo decoding of parallel and serial concatenated convolutional codes (PCCCs and SCCCs) decoding of trellis coded modulation (TCM) in interleaved frequency-selective fading channels as well as various multidimensional detection problems. The core building block in these iterative schemes include the soft-input soft-output (SISO) module. The building block may also include a novel technique similar to the Viterbi Algorithm (VA) that accepts a priori information on the input and output symbols of an FSM and outputs the corresponding a posteriori information, with complexity growing linearly with the record length.

The codes are constructed as concatenations of simple constituent codes, and have been shown to achieve near-capacity performance. In a standard PCCC, shown in FIG. 1A, a block of the input sequence is encoded by a Convolutional Code (CC), while an interleaved version of the input sequence is encoded by a second CC. The two coded symbols are then mapped to the constellation points and transmitted over the channel. In some cases, the mapping may be performed after puncturing.

Figure 1A:
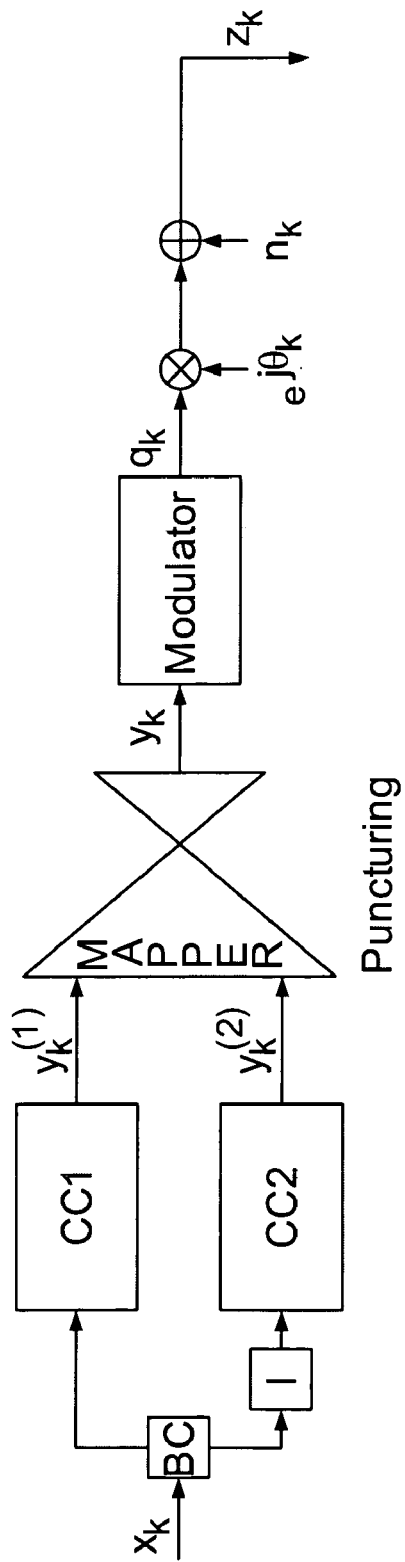
FIG. 1A is a block diagram of an input sequence block encoded by a Convolutional Code (CC), and an interleaved version of the input sequence encoded by a second CC.
Figure 1B:
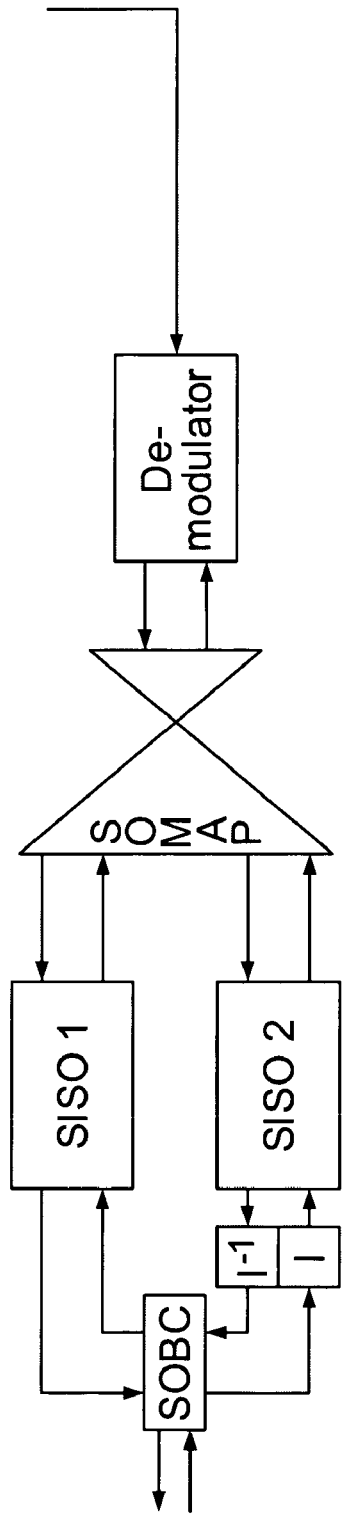
FIG. 1B is an iterative detector network for perfect Channel State Information (CSI).

When perfect Channel State Information (CSI) is available, a decoder that approximates Maximum Likelihood Sequence Detection (MLSD) performance with reasonable complexity can be constructed, by utilizing iterative detection (ID). The effectiveness of ID may be attributed to the exchange of soft information related to the input/output symbols of each constituent CC. A systematic approach to designing ID receivers may be presented for systems having an interconnection of multiple subsystems. In this approach, soft inverse blocks—each one corresponding to a subsystem in the original network—may be connected in an intuitive way to form the ID network. In general, the soft inverse requires marginalization of joint probabilities over all combinations of possible input/output sequences. This is the operation described, for example, by the Soft Mapper (SO-MAP) soft inverse block. When the system is an FSM, however, the soft inverse may be computed efficiently using the so-called forward-backward Soft-Input Soft-Output (SISO) technique. Such a receiver is shown in FIG. 1B for the case of PCCC with perfect CSI. This general view of iterative detection is broadly applicable and consistent with the view of message passing or belief propagation on graphical models. For details on this equivalence and the graphical approaches see Keith Chugg, Achilleas Anastasopoulos, Xiaopeng Chen, Iterative Detection: Adaptivity, Complexity Reduction, and Applications, by Kluwer Academic Publishers, 2001.

Figure 2A:
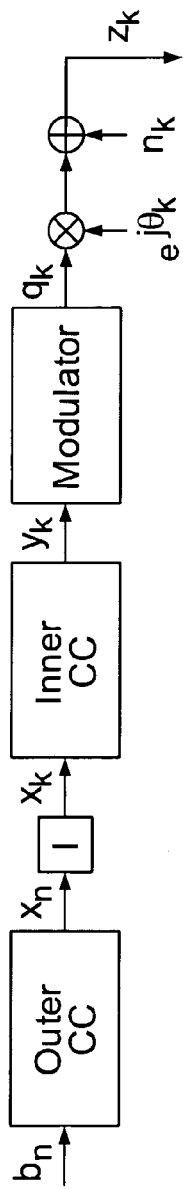
FIG. 2A is an iterative detector configured as a serial concatenation of convolutional codes (CCs).
Figure 2B:
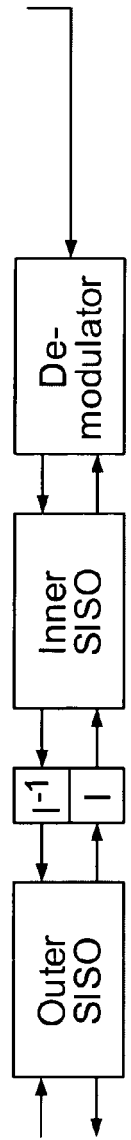
FIG. 2B is an iterative detector network for perfect CSI.

Iterative detection (ID) may be utilized in various diverse applications. For example, ID may be utilized to decode Serially Concatenated Convolutional Codes (SCCCs). As shown in FIG. 2A, in a SCCC the sequence of source bits is convolutionally encoded using an outer CC. These symbols are fed to an inner CC through a pseudo-random interleaver. The output symbols are then mapped onto the constellation points and transmitted to the channel. The corresponding iterative decoder may be constructed using soft inverse blocks, as in the case of PCCC, as shown in FIG. 2B.

In many practical situations where perfect channel state information (CSI) is not available at the receiver (e.g., PCCCs and SCCCs with carrier phase tracking or TCM in fast frequency-selective fading channels), an adaptive iterative detection (AID) scheme may be required to deal with the unknown, and possibly time-varying parameters. The present disclosure discloses a subclass of adaptive iterative receivers in which the parameter estimates are not exchanged as part of the iterative procedure. Rather, the parameter estimates are generated and are confined inside the adaptive SISO (A-SISO) modules, which are the natural extension of the SISO modules for the case of parametric uncertainty. Nevertheless, the exchange of soft information on the symbols provides an implicit mechanism for the re-estimation of the unknown parameters as well.

In a case of the unknown parameter being modeled as a Markov chain with finite number of states, the optimal A-SISO includes a modified SISO that runs on the augmented FSM. Another case may include the parameter being continuous in nature (e.g., phase offset or channel taps). Attempts to solve this more general problem were based on the Baum-Welch method (or equivalently the expectation maximization (EM) technique). Since convergence to a locally optimal solution is possible, the optimality of the EM technique cannot always be guaranteed. In some cases, a Gauss-Markov (GM) model may be assumed for the unknown parameter and the optimal scheme may be derived. Starting from a different viewpoint, structurally similar techniques may also be derived for GM and deterministic parameter models, respectively. A sub-optimal A-SISO with a single-parameter estimator may further be developed. However, the inherent limitation of all the above approaches is that they all operate in a fixed lag (FL) mode; thus, two major conflicting goals in designing a practical technique are coupled through a single parameter, the smoothing depth. Indeed, in an FL technique, a large decision delay (smoothing depth) is required to deliver reliable soft information. However, the same parameter determines the amount of pruning of the sequence tree and needs to be kept as small as possible, especially since it results in exponential complexity growth.

In the present disclosure, meaningful soft metrics for the GM parameter preprocessing model are defined and expressions are derived in a novel way. This motivates a family of sub-optimal techniques leading directly to fixed interval (FI) schemes that have linear complexity with the record length N, as is the case for SISOs when no parametric uncertainty is present. The unique characteristic of the family of sub-optimal techniques may include the decoupling of complexity and smoothing depth. Furthermore, all existing A-SISO techniques for continuous valued parameter models may be viewed as forward only special cases within this framework. An application examined in the present disclosure describes TCM in interleaved frequency-selective fading channels. In this application, the effectiveness of the various A-SISO options has been assessed via extensive simulations. The impact of parametric uncertainty on previously established conclusions for iterative detection in systems including concatenated FSMs, is described.

Advantages of Iterative Detection

Figures 3A, 3B:
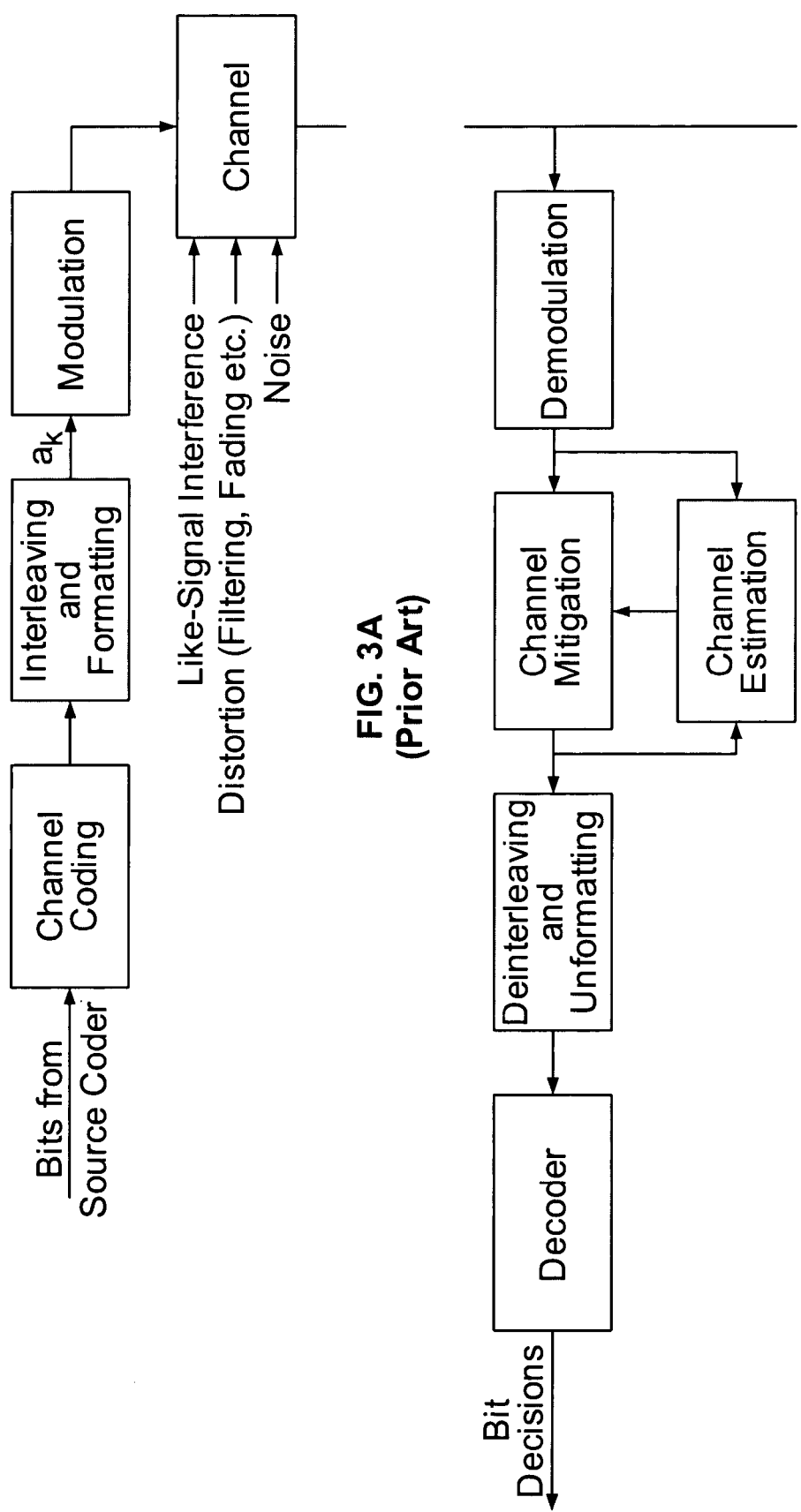
FIG. 3A shows a transmitter portion of a conventional digital communication system.
FIG. 3B shows a receiver portion of a conventional digital communication system.

FIGS. 3A through 3D illustrate one embodiment of a digital communication system. FIG. 3A shows a transmitter portion of the system, which may include channel coding, interleaving, and modulation of transmission signal. The receiver block diagram illustrated in FIG. 3B mirrors the processing performed in many practical receiver implementations. This segregated design paradigm allows each component of the receiver to be designed and "optimized" without much regard to the inner workings of the other blocks of the receiver. As long as each block does the job it is intended for, the overall receiver should perform the desired task: extracting the input bits.

Figure 3C:
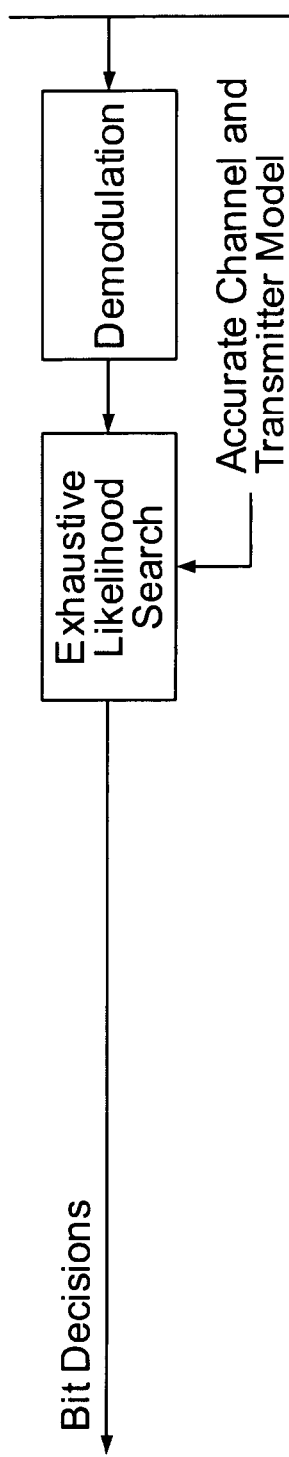
FIG. 3C is a block diagram of an optimal receiver processing.

However, despite the comprehensiveness of FIG. 3B, it may not be optimal from the standpoint of performance. More specifically, the probability of error for the bit estimates or bit-sequence estimate is not minimized by this structure. This segregated processing is adapted for tractability—both conceptual tractability and tractability of hardware implementation. The optimal receiver for virtually any system is conceptually simple, yet typically prohibitively complex to implement. For example, consider the transmission of 1000 bits through a system of the form in FIG. 3A. These bits may undergo forward error correction coding (FEC), interleaving, training insertion (pilot, synchronization fields, training sequences, etc.), before modulation and transmission. The channel may corrupt the modulated signal through random distortions (possibly time-varying and non-linear), like-signal interference (co-channel, multiple access, cross-talk, etc.), and additive noise. Thus, regardless of the complexity of the transmitter and/or channel, the optimal receiver would compute $2^{1000}$ likelihoods and select the data sequence that most closely matches the assumed model. This is shown in FIG. 3C. Ignoring the obvious complexity problems, this requires a good model of the transmitter formatting and the channel effects. For example, the likelihood computation mentioned above may include averaging over the statistics of a fading channel model or the possible data values of like-signal interferers.

Figure 3D:
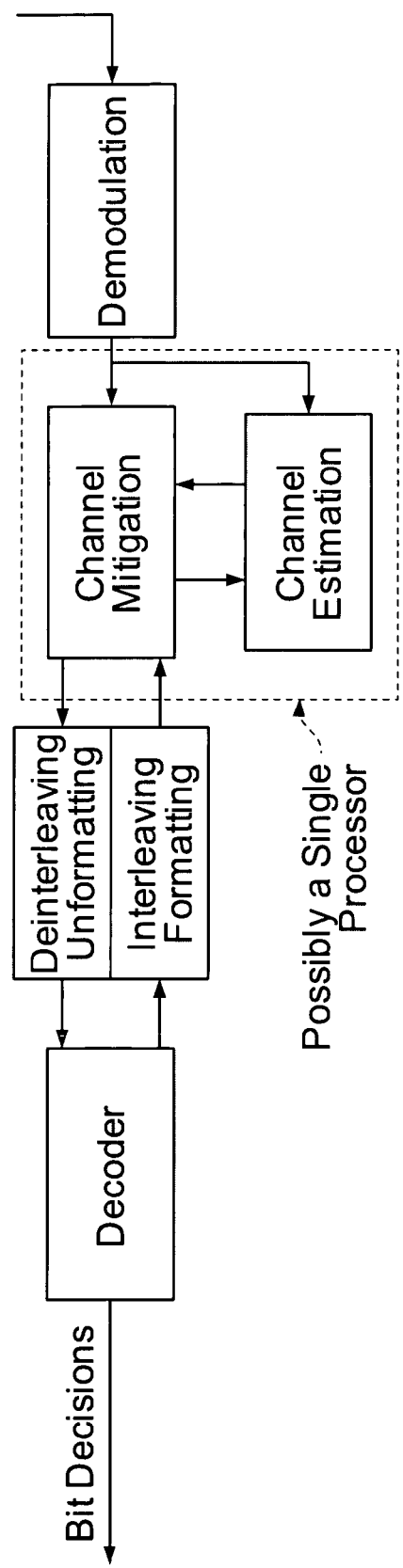
FIG. 3D is a receiver based on an adaptive iterative detection principle.

Data detection and parameter estimation are done using the entire global system structure. Unlike the direct approach in FIG. 3C, the iterative receiver in FIG. 3D exploits this structure indirectly. The key concept in this approach is the exchange and updating of "soft information" on digital quantities in the system (e.g., the coded modulation symbols). This concept is shown in FIG. 3D. The iterative detection receiver is similar to the conventional segregated design in that, for each subsystem block in the model, there is corresponding processing block. In fact, each of these corresponding processing blocks in the receiver of FIG. 3C exploits only local system structure—e.g., the FEC decoder does not use explicit knowledge of the channel structure. As a consequence, the complexity of the receiver in FIG. 3D is comparable to the traditional segregated design in FIG. 3B (i.e., the increase in complexity is usually linear as opposed to the exponential increase in complexity associated with the optimal processing in FIG. 3C).

The distinction between segregated design of FIG. 3B and that of FIG. 3D, however, is that the processing for each sub-block in FIG. 3D is biased by some beliefs on its inputs and outputs. These beliefs (also referred to as reliabilities, soft decision, or soft information) are provided to each local processing unit by other processing units connected to it. These beliefs represent marginal soft information in that they are beliefs on the individual symbols as opposed to the entire sequence. The task of the processing unit is to update the beliefs on the input and output variables of the corresponding system sub-block in FIG. 3A. Each sub-block processing unit will be activated several times, each time biased by a different (updated) set of beliefs.

For example, suppose that a system using convolution coding and interleaving experience severe like-signal interference and distortion over the channel. In this case, the channel mitigation block in FIG. 3B will output hard decisions on the coded/interleaved bit sequence $a_k$. Suppose that, given the severity of the channel, the error probability associated with these coded-bit decisions will be approximately 0.4. Deinterleaving these decisions and performing hard-in (Hamming distance) decoding of the convolution code will provide a very high bit error rate (BER)—i.e. nearly 0.5.

For the receiver in FIG. 3D, however, the channel mitigation block produces soft-decision information on the coded/interleaved bit sequence $a_k$. For example, this may be thought of as two numbers $P[a_k=1]$ and $P[a_k=0]$ that represent a measure of current probability or belief that the k-th coded bit $a_k$ takes on the value 1 or 0, respectively. Soft decisions contain more information than the corresponding hard decisions. In this example, it is possible that even though the hard decisions on $a_k$ associated with the receiver of FIG. 3B are hopelessly inaccurate, the soft decision information contains enough information to jump-start a decoding procedure.

A receiver of the form in FIG. 3D would pass the soft information through a deinterleaver to a soft-in decoder for the convolutional code. This decoder is a modified version that produces beliefs on the coded bits as well as uncoded bits. Thus, after activation of this decoder, a decision on the uncoded bits may be made. Alternatively, the updated beliefs on the coded bits may be interleaved and used in the role of a-priori probabilities to bias another activation of the channel mitigation processing unit in FIG. 3D. In fact, this processing may be repeated with the channel mitigation and FEC decoder exchanging and updating beliefs on the coded bits through the interleaver/deinterleaver pair. After several iterations, final decisions may be made on the uncoded bits by thresholding the corresponding beliefs generated by the code processing unit. This is referred to as iterative detection.

A. Complexity Reduction

Since the processing of FIG. 3D approximates the performance of the optimal processing with much lower complexity, iterative detection may be viewed as a complexity reduction tool. This complexity reduction is based on the partitioning or decomposition of the system into subsystems. Specifically, the complexity of the receiver in FIG. 3D is roughly the sum of the complexities of the individual processing units, multiplied by the number of times each is activated (i.e. number of iterations). Since each of these processors uses only local structure, the associated complexity is roughly the same as the optimal decoder for that subsystem in isolation. For example, in the soft-decoder described in the above example has roughly the same complexity as the well-known Viterbi Algorithm (VA). A key conceptual point is that the partitioning described is entirely arbitrary. The system may be decomposed into any number of equivalent block diagrams, each of which faithfully represents the system structure. This modeling choice, however, impacts the complexity of the associated processors in FIGS. 3B and 3D. For example, the receiver in FIG. 3C corresponds to a model without decomposition and is prohibitively complex. Furthermore, the notion that exchanging and updating soft information may be a replacement for hypothesis searching effort may be exploited aggressively to provide complexity reduction for systems that may not even have been modeled as a concatenation of subsystems.

B. Adaptivity

Acquisition and tracking of channel parameters (e.g., carrier phase and frequency, symbol synchronization, channel impulse response, etc.) may also be included into the iterative processing of FIG. 3D. In the above example, the interference and distortion associated with the channel may be unknown and/or time-varying. Therefore, the channel mitigation processor should estimate and track these parameters (possibly aided by some training signals). In an iterative detector, it is possible to re-estimate these parameters at each activation of the channel mitigation-processing unit. The estimates are different for each of these activations because the reliability information biasing this estimation changes. Specifically, it is refined by the code processor using the structure of the code. Thus, through the passing of marginal soft information and iteration, the channel estimator indirectly uses the global system structure. A decision directed estimation processor may operate with the coding gain even when isolating interleavers are present. For an isolated system, this may be possible using joint parameter estimation and data detection (e.g. Per-Survivor Processing). However, these adaptive iterative detection approaches are applicable to systems comprising concatenated subsystem (e.g. concatenated codes with interleaving).

System and Channel Model

Consider a typical time-division multiple-access (TDMA) cellular transmission system having a memory-less source that feeds a convolutional code. The trellis-coded symbols are interleaved, mapped into a constellation, and pulse-shaped before transmission. The low-pass equivalent transmitted signal may be of the form $$s(t) = \sqrt{E_s} \sum_{k=-\infty}^{\infty} d_k p(t - kT) \qquad (1)$$

where $d_k$ is the coded symbol (normalized to unit energy), $E_s$ is the symbol energy, p(t) is the shaping pulse (normalized to unit energy), and T is the symbol duration. This signal is distorted by a time-varying frequency-selective fading channel with impulse response of the form $$c(t, \tau) = \sum_{n=0}^{L_c} c_n(t)\delta(\tau - nT_r) \qquad (2)$$

where $T_r = T/N_r$ with $N_r$ integer, and the dynamics of the vector random process $\underline{c}(t) = [c_0(t), \ldots, c_{L_c}(t)]^T$ are assumed to be slow compared to the symbol duration T. The distorted signal is observed in additive white Gaussian noise (AWGN) with power spectral density level $N_o$.

$$z(t) = \sqrt{E_s} \sum_{k=-\infty}^{\infty} d_k \sum_{n=0}^{L_c} c_n(t) p(t - kT - nT_r) + n(t). \quad (3)$$

Several options are available at the receiver front-end (FE) for preprocessing the received signal: low-pass filtering or match filtering with $P^*(-t)$, followed by fractionally-spaced sampling every $T_s$ (where $T_s = T/N_s$, with $N_s$ integer), followed by noise whitening (if necessary). Regardless of the specific FE structure, the FE output may be modeled as an equivalent symbol-spaced vector inter-symbol interference (ISI) channel as follows:

$$\begin{aligned} z_k &= \sqrt{E_s} \sum_{n=0}^{L} d_{k-n} \underline{g}_k(n) + \underline{n}_k \quad (4a) \\ &= \sqrt{E_s} [d_k, \ldots, d_{k-L}] \circ \underline{g}_k + \underline{n}_k \\ &= \underline{q}_k^T \circ \underline{g}_k + \underline{n}_k = \underline{q}_k^T \circ (V \underline{c}_k) + \underline{n}_k \quad (4b) \end{aligned}$$

where $\underline{z}_k$, $\underline{n}_k$ and $\underline{g}_k(n)$ are all $N_s$-dimensional vectors, and $\underline{n}_k$ is complex, circular AWGN with independently, identically distributed components and $E\{\|\underline{n}_k\|^2\} = N_0$. The $N_s(L_c + 1)$-dimensional vector $\underline{c}_k = [c_0(kN_sT_s), \ldots, c_0((kN_s+N_s-1)T_s), \ldots, c_{L_c}((kN_s+N_s-1)T_s)]^T$ contains all the information relevant to the channel process $\underline{c}(t)$, while all the details of the pulse shaping and the FE are included in the matrix V. Finally, the $N_s(L+1)$-dimensional vector $\underline{g}_k = [\underline{g}_k^T(0), \ldots, \underline{g}_k^T(L)]^T$ is the equivalent channel (which includes the effect of pulse shaping, channel, and FE) at time x, and the shorthand diamond ($\circ$) notation is used in equation (4b) to denote the mixed inner product implied by equation (4a).

Equations (4a) and (4b) may be used under either a stochastic or an a-stochastic (i.e., deterministic) assumption for $\underline{c}(t)$. An often used model for $\underline{c}_k$, and thus $\underline{g}_k = V\underline{c}_k$ is that of a Gaussian autoregressive-moving average (ARMA) process, generated by the plant equations $$\phi_{k+1} = \Phi \phi_k + \underline{v}_k, \underline{c}_k = C\phi_k \quad (5)$$

where $\underline{v}_k$ is a white noise sequence and the dimensionality of the state $\phi_k$ is in general higher than $\underline{c}_k$. It has been shown that such model may adequately approximate realistic fading channels with non-rational spectrum.

Although the specific FE processing (i.e., the matrix) may be important for making quantitative claims and for claiming optimality, qualitative conclusions about different post-processors remain the same for different FEs (e.g., per-survivor Processing (PSP) outperforms the conventional, adaptive maximum-likelihood sequence detector (CA-MLSD)). The present disclosure focuses on the introduction of novel post-processing approaches that are valid for any FE processing. However, in order to improve the readability of the development and to reduce the simulation effort, we focus on the following special case. In particular, regarding the channel model in equation (5), a first-order GM model is adopted for $\underline{c}_k$, and thus $\underline{g}_k$ (i.e., $\phi_k = \underline{c}_k$ is assumed). Furthermore, the concepts are illustrated using a simplified symbol-spaced scalar ISI model (i.e., $N_s = 1$). Once the concepts introduced are understood, the techniques may be modified to account for the more general case of $N_s > 1$ and arbitrary plant model.

In the following, a model for a generic FSM is presented. The output $y_k$ of a generic FSM can be defined as a function of its input $x_k$ and state $s_k$—together constituting the transition $t_k = (s_k, x_k)$—through the equations $$y_k = \text{out}(x_k, s_k) \quad s_{k+1} = ns(x_k, s_k) \quad (6)$$

where each integer quantity $u_k$ (i.e., $x_k$, $y_k$, $s_k$ or $t_k$) is assumed to take values in the set $A_u = \{0, 1, \ldots, N_u - 1\}$. The output $y_k$ of the FSM is either used as an input to another FSM, or observed indirectly, through a function, which also involves the unknown parameter $g_k$. Under the simplifying assumption mentioned earlier, the $(L+1)$-dimensional vector process $\{g_k\}$ evolves in time according to the equations $$g_k = Gg_{k-1} + w_k \text{(forward)}$$

$$g_k = G^b g_{k-1} + v_k \text{(backward)} \quad (7)$$

where $w_k$, $v_k$ are zero-mean Gaussian vectors with covariance $K_w(m) = Q\delta_K(m)$ and $K_v(m) = Q^b \delta_K(m)$, respectively.

Equation (4) may now be written as $$z_k = f(y_k)^T g_k + n_k = q_k^T g_k + n_k = m_k + n_k \quad (8)$$

where $q_k = f(y_k)$ is a complex vector depending on the modulation format (e.g., in the TCM system, $f(\bullet)$ maps the output of the inner FSM, which is the entire transition $y_k = t_k$, to the $L+1$ constellation points, as shown in equation (4)).

Exact Evaluation of the Soft Metrics

The objective of a SISO technique is to provide soft information about the input and output symbols of the FSM based on the observation record. This reliability information may either be in the form of an a posteriori probability or any other related quantity. It would be advantageous at this point to generalize the notion of the state $s_k$ and transition $t_k$ to longer sequence portions (e.g., a super-state and super-transition may be defined as $s_k^s = (t_{k-d}, \ldots, t_{k-1}, s_k)$ and $t_k^s = (t_{k-d}, \ldots, t_k)$ for arbitrary d). This may also be viewed as the "trellis state" ("trellis transition") that is used in the receiver and need not be the same as that which defines the system model (e.g., encoder). This foreshadows the result that the optimal techniques do not "fold" onto a trellis as in the case of known channel and that the size of the trellis eventually used is a design parameter. For a generic quantity $u_k$ (i.e., $x_k$, $y_k$, $s_k$, $t_k$, $s_k^s$, $t_k^s$, etc), we define the a posteriori probability (APP) and minimum sequence metric (MSM) soft outputs as follows:

$$\begin{aligned} APP_p(u_k) &= P(u_k \mid z_0^n) \quad (9a) \\ &= c \sum_{x_0^n : u_k} P(z_0^n, x_0^n) \\ &= c \sum_{x_0^n : u_k} E_\theta \{P(z_0^n, x_0^n \mid \Theta)\} \end{aligned}$$

$$\begin{aligned} MSM_p(u_k) &= -\log\left[\max_{x_0^n : u_k} P(z_0^n \mid x_0^n)\right] \quad (9b) \\ &= c' - \log\left[\max_{x_0^n : u_k} P(z_0^n, x_0^n)\right] \\ &= c' - \log\left[\max_{x_0^n : u_k} E_\theta \{P(z_0^n, x_0^n \mid \Theta)\}\right] \end{aligned}$$

where $x_0^n : u_k$ denotes all input sequences consistent with $u_k$, and c, and c' are normalizing constants. These soft outputs are the direct generalizations of well-known soft outputs for perfect CSI to the case of an unknown parameter Θ. When the SISO module is part of an iterative receiver, the soft output is usually normalized to the a priori information resulting in the so-called extrinsic information (e.g., $APP_p(u_k)/P(u_k)$, or $MSM_p(u_k)-(-\log P(u_k))$ is used in place of $APP_p(\bullet)$ or $MSM_p(\bullet)$ respectively). We observe that in both cases, the soft outputs may be derived from the quantity $E_\theta\{P(z_0^n,x_0^n|\Theta)]$ by either averaging or maximizing—for $APP_p(\bullet)$ or $MSM_p(\bullet)$, respectively—over the nuisance parameters $x_0^n:u_k$.

Equation (9) suggests a way of manipulating $P(z_0^n,x_0^n|\Theta)$ to obtain the proposed soft metrics. Maintaining the conditioning over the entire input sequence, expectation may be performed on the unknown parameter. Combining of the resulting metrics over the nuisance parameters $x_0^n:u_k$ is performed as a final step, leading to the final two soft metrics for $u_k$. Since operators $\Sigma x_0^n:u_k$ and $E\theta$ commute, an additional choice is available for the evaluation of the metric in equation (9a). Here, the sequence combining is done initially, followed by the parameter elimination. Different soft metrics can also be defined by interchanging the $\max(x_0^n:u_k)$ operator with the $E\theta$ operator in equation (9b). This option will not be pursued in this work, mainly because it does not appear to lead to rigorously expressed optimal structures.

A. Parameter-First Combining

Optimal techniques for the evaluation of the soft outputs defined in equations (9a) and (9b), and more precisely the quantity $P(z_0^n,x_0^n)$ are derived. It is noted once more that these techniques are optimal for a given FE processing at the receiver. The obvious approach is a straightforward evaluation of this likelihood for each of the $(N_x)^{n+1}$ input sequences. The procedure is concluded with the appropriate combining of these quantities (summation or maximization for $APP_p(u_k)$ or $MSM_p(u_k)$, respectively). This type of processing is based on the fact that the likelihood $P(z_0^n,x_0^n)$ may be computed recursively $$P(z_0^k, x_0^k) = P(z_k | z_0^{k-1}, x_0^k)P(x_k)P(z_0^{k-1}, x_0^{k-1}) \quad (10)$$

$$= N(z_k; q_k^T \tilde{g}k|k-1; N_0 + q_k^T \tilde{G}k|k-1q_k^*) \times$$

$$P(x_k)P(z_0^{k-1}, x_0^{k-1})$$

where $N(z;m;\sigma^2)$ denotes the probability density function of a complex circular Gaussian random variable with mean m, and variance $\sigma^2/2$ for the real and imaginary part, while $\tilde{g}_k|_{k-1}$ and $\tilde{G}_{k|k-1}$ are the channel one-step prediction and corresponding covariance matrix generated by a sequence-conditioned Kalman filter (KF). This technique, although efficient, results in sub-optimal techniques where complexity and smoothing depth are exponentially coupled, as mentioned above.

An alternative optimal procedure for the likelihood calculation is now described. Future observations depend on past observations conditioned on the state of the FSM because of the presence of the parameter process $\{g_k\}$. However, by conditioning on the parameter $g_k$ as well, separation of the future and past observations occurs, yielding equation (11).

$$P(z_0^n, x_0^n) = P(z_0^k, x_0^k)P(z_{k+1}^n,$$

$$x_{k+1}^n | s_{k+1}) \int_{g_k} \frac{P(g_k | x_0^k, z_0^k)P(g_k | s_{k+1}, x_{k+1}^n, z_{k+1}^n)}{P(g_k)} dg_k \quad (11)$$

The relation in equation (11) and subsequent analogous expressions are the basis for the practical techniques proposed in the next section. It indicates that the likelihood may be split into three factors, of which the first two depend each on the past/present and future, respectively. The third may be viewed as a weighting factor that binds them together. Thus, the third factor quantifies the dependence of the future, present and past that is introduced due to the parameter process $\{g_k\}$ and in the absence of parametric uncertainty would be eliminated. An alternative interpretation may be offered by realizing that is the expression in equation (11) is closely related to the total mean square error of a sequence-conditioned Kalman smoother. A closed-form expression may be found for the binding factor since it involves an integral of Gaussian densities. The first factor in equation (11) is recursively evaluated using equation (10), while the second factor is calculated through a similar backward recursion.

$$P(z_{k+1}^n, x_{k+1}^n | s_{k+1}) = P(z_{k+1} | z_{k+2}^n, s_{k+1}, x_{k+1}^n)P(x_{k+1}) \times \quad (12)$$

$$P(z_{k+2}^n, x_{k+2}^n | x_{k+2})$$

$$= N(z_{k+1}; q_{k+1}^T \tilde{g}_{k+1|k+2}^b; N_0 +$$

$$q_{k+1}^T \tilde{G}_{k+1|k+2}^b q_{k+1}^*) \times$$

$$P(x_{k+1})P(z_{k+2}^n, x_{k+2}^n | s_{k+2})$$

Figure 4:
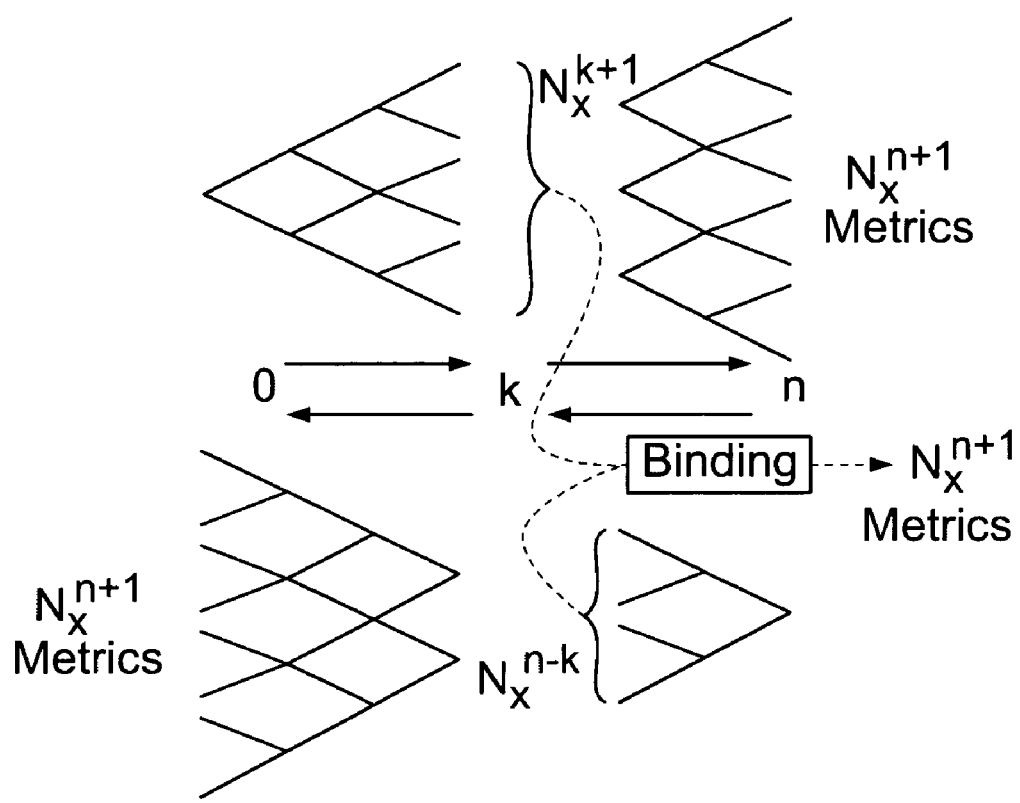
FIG. 4 illustrates a likelihood evaluation using forward/backward tree structures.

The scheme suggested by equations (10)–(12) is illustrated in FIG. 4 and may be described as follows. Starting at time 0, a forward $N_x$-ary tree is built, each node of which represents a sequence path. The likelihood $P(z_0^{k-1},x_0^{k-1})$, together with $\tilde{g}_k|_{k-1}$ and $\tilde{G}_k|_{k-1}$ of that path are stored in each node. At each time k, the tree is expanded forward and the probabilities corresponding to the newly branches are calculated using equation (10). It is implied from this equation that a KF that depends on the entire path history is required to complete the recursion. Similarly, starting at time n, a backward tree is expanding according to the recursion equation (12). The relevant channel estimates are provided by a per-path backward running KF. After k+1 forward and n−k backward steps, the two trees meet each other. The likelihood of each sequence $x_0^n$ may now be evaluated as indicated by equation (11). The $(N_x)^{k+1}$ likelihoods corresponding to the nodes of the forward tree are combined with the $(N_x)^{n-k}$ likelihoods corresponding to the nodes of the backward tree (future) and weighted by the binding factor in equation (20). The final soft output for a generic quantity $u_m$ is the summation (or maximization) over all factors with the same $u_m$. Note that the choice of k, the particular point in time when the past and future metrics are combined, is completely arbitrary (i.e., it is not related to m). In fact, the two extreme values k=n and k=o correspond to a single forward or a single backward tree. In a practical technique, however, the reference point k is chosen to be in the neighborhood of m, in order to maximize the number of relevant sequences combined to produce the soft information on $u_m$. Thus, while it may seem redundant to store and update both a forward and a backward tree (i.e., same result can be accomplished with a single forward tree), the fact that the two trees may be pruned independently, decouples complexity and observation length, leading to practical techniques, as will be discussed below.

B. Sequence-First Combining

The special form of $APP_p(u_k)$ allows us to obtain alternative expressions for the optimal soft outputs by realizing that the expectation operators in equation (9a) may be interchanged, to obtain $APP_p(u_k)=cP(o_0^n,u_k)$. In particular, a straightforward expression for $APP_p(t_k)$ may be derived by utilizing the fact that the process $\{(t_k,g_k)\}$ is a mixed-state Markov chain. Unfortunately, the storage requirement for these recursions may be infinite due to the fact that $g_k$ takes values in a continuous space. Although it is conceivable to quantize the channel values, another approach may be followed. A derivation similar to equation (11) leads to equation (13).

$$P(z_0^n, t_k) = P(z_0^{k-1}, s_k)P(z_{k+1}^n | s_{k+1}) \int_{g_k} \underbrace{\frac{g_k)P(x_k)P(g_k | s_k+1, z_{k+1}^n)}{P(g_k)}}_{b_p'(\cdot)} dg_k \qquad (13)$$

The forward and backward recursions for the first two quantities are as follows:

Aside from the evident similarity of equations (13) and (14) with equations (11), (10), and (12), there are two important differences as follows:

$$P(z_0^k, s_{k+1}) = \sum_{t_k:s_{k+1}} P(z_0^{k-1}, s_k) \times P(z_k | t_k, z_0^{k-1}, x_k) \qquad (14a)$$

$$P(z_{k+1}^n | s_{k+1}) = \sum_{t_{k+1}:s_{k+1}} P(z_{k+1} | t_{k+1}, z_{k+2}^n) \times P(x_{k+1})P(z_{k+2}^n | s_{k+2}) \qquad (14b)$$

Figure 5:
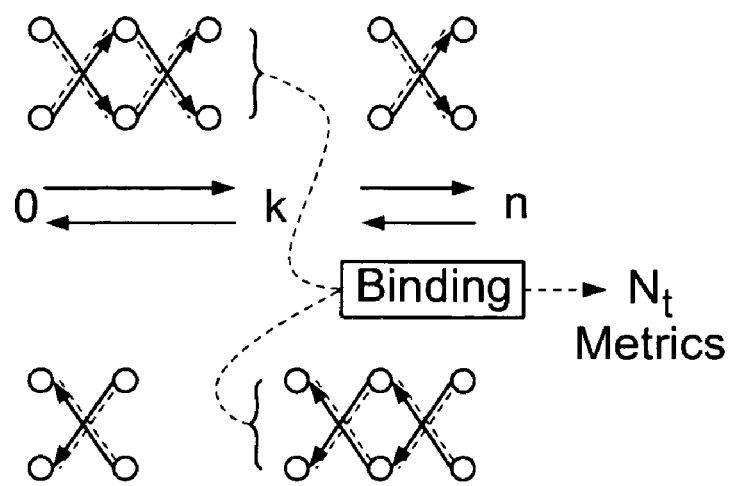
FIG. 5 illustrates soft metric evaluation in the case of sequence-first combining.

1) the recursions described here do not depend (at least explicitly) on the entire path history and 2) the evaluation of the third factor of equation (13) as well as the innovation factors in equation (14) is complicated due to the fact that they are mixed-Gaussian densities. Nevertheless, assuming that the latter difficulty may be overcome, the technique suggested by equation (13) and (14) is much simpler: only a forward and backward recursion is performed over a state trellis, followed by a combining (multiplication) of the updated quantities with an appropriate weight (third factor). This procedure is depicted in FIG. 5. The generalized states $s_k^s$ and transitions $t_k^s$ may be used with the corresponding updating equations unchanged.

C. Comments on the Deterministic Parameter Model

In the case when the unknown parameter is modeled as a deterministic constant, and expectation over the unknown $\Theta$ is not feasible, a reasonable soft output choice is $$APP_d(u_k) \stackrel{def}{=} c \sum_{x_0^n:u_k} \max_{\Theta} P(z_0^n, x_0^n | \Theta) \qquad (15)$$

$$MSM_d(u_k) \stackrel{def}{=} c' - \log\left[\max_{x_0^n:u_k} \max_{\Theta} P(z_0^n, x_0^n | \Theta)\right]. \qquad (16)$$

The development of the exact expressions for this modeling option is similar to that associated with the GM channel. The resulting expressions are structurally similar with the main difference being the channel estimator, which is a recursive least-squares (RLS) estimator instead of the KF. Similarly to the GM case, by exchanging the order of maximization in equation (16), sequence-first expressions may be developed as well.

Sub-Optimal (Fixed-Complexity) Algorithms

The exact evaluation of the soft metrics developed above involves likelihood updates on a forward and backward tree, assisted by per-path filters, followed by binding of the past and future metrics. Accordingly, any sub-optimal technique for the case of parameter-first combining may be interpreted as the result of applying one or more of the following simplifications:

1) non-exhaustive tree search;
2) non-Kalman channel estimators; and
3) sub-optimal binding of the past and future metrics.

Similarly, for the case of sequence-first combining, any sub-optimal technique is the result of a simplifying assumption for the innovation factors, as well as a simpler form for the channel estimators and binding factor in equation (13). This design space is partially explored below.

A. Parameter-First Combining

1) Tree-Search Techniques: Regarding the tree search, many options are available to prune the sequence tree. Since breadth-first schemes maintain a common front in the search process, the schemes may be appropriate for soft-decisions. This facilitates the combining task. One such technique is the VA, which maintains and updates—through the familiar add compare select (ACS) operations—a fixed number of paths in such a way that they are forced to have different recent paths. A technique for evaluating MSM(•) metrics, proceeds by extending and eliminating paths in the same way as in the hard-decision case, while the completion is performed by minimizing the corresponding transition metrics. The formulation of a practical technique for calculating APP(•) metrics involves summation of the sequence metrics as well as tree pruning. A technique that combines these two tasks may be derived employing either the PSP principle, or equivalently, the decision-feedback (DF) assumption.

Figure 6:
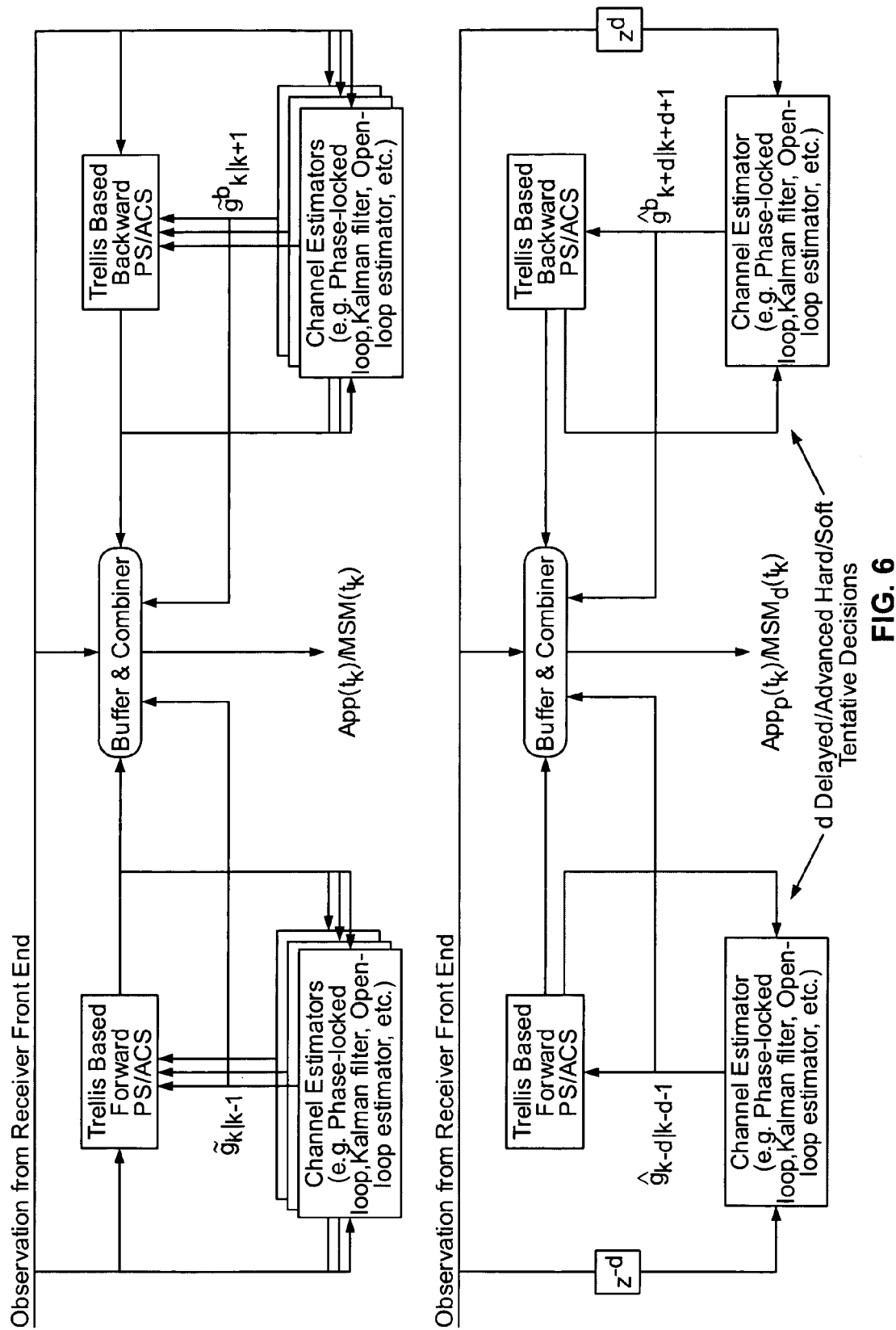
FIG. 6 illustrates a Trellis-based adaptive soft-in/soft-out (A-SISO) technique with multiple or single estimator.

The resulting FI techniques, shown in FIG. 6, include a single forward and backward recursion over the entire observation record, similar to the ones performed in the classical SISO. Product sum or ACS operations are performed for the metric updates, for APP or MSM soft metrics, respectively. A KF channel estimate is kept for every trellis state and updated in a PSP fashion. The soft outputs for $x_k$ and $y_k$ are derived from the soft output of the transition $t_k$. The latter is computed as the product (sum) of the forward metric of the starting state $s_k$, the transition metric of $t_k$, the backward metric of the ending state $s_{k+1}$, and the binding factor corresponding to $t_k$. However, the trellis on which this technique operates is not tightly related to the FSM trellis. The trellis size is a design parameter that determines the amount of pruning in the forward and backward trees, and eventually, the complexity of the technique.

2) Channel Estimate and Binding Factor Simplification: Any near-optimal receiver has to search over as many paths as possible for a given amount of resources, so it is desirable to reduce the complexity associated with the metric updates and in particular the channel estimates. One such simplification is to substitute KF channel estimation with the least mean-squares (LMS) technique, so no matrix storage and update is required. This simplification may be derived in a more rigorous manner for the case of deterministic parameter model, resulting in a simple and insightful expression for the binding factor shown in equation (17).

$$-\log b_p(\cap) \sim \|\tilde{g}_{k|k-1} - \tilde{g}_{k+1|k+2}^b\|^2. \quad (17)$$

The above expression may be interpreted as follows. If the forward and backward channel estimates corresponding to a particular sequence are not consistent, a penalty is paid by means of increasing the sequence metric.

B. Sequence-First Combining

1) Metric Simplification: Starting from equation (14), sub-optimal techniques may be derived by employing a simplifying assumption for the innovation factors $P(z_k|t_k, z_0^{k-1})$, $P(z_{k+1}|t_{k+1}, z_{k+2}^n)$. The Gaussian approximation for the above innovation terms leads to an attractive technique since only the state-conditioned/sequence-averaged forward (i.e., $\tilde{g}_{k|k-1}(s_k) = E(g_k|s_k, z_0^{k-1})$) and backward channel one-step predictions together with the corresponding covariances need to be maintained and updated. Note that these estimates are only partially conditioned on the data sequence through the state $s_k$ (or more generally the super-state $s_k^s$). Recursive update equations for these partially conditioned (PC) channel estimates are very similar to the KF recursions, thus we use the name PCKF. Furthermore, in the limiting case when the super-state represents the entire sequence, the innovation factors become precisely Gaussian and the PCKF becomes the sequence-conditioned KF; this is the exact scenario of the parameter-first combining in the GM case. Under the Gaussian assumption, a closed-form expression for the binding factor in equation (13) may be derived as well, resulting in a function similar to $b_p(.)$.

2) Further Channel Estimator Simplification: In addition to the Gaussian approximation, a further simplification occurs under the assumption that the conditional means and covariances of the channel are not functions of the states $E(g_k|s_k, z_0^{k-1}) \approx E(g_k|z_0^{k-1}) = \tilde{g}_{k|k-1}$. This approximation may result in a desirable solution, since only a single forward and a single backward global estimator (aver aged over the sequence) needs to be maintained and updated. Assuming that a probabilistic description $P'(t_k)$ is available for the transitions $t_k$, a recursion can be derived for $\hat{g}_{k|k-1}$. The application of this single-estimator idea is inhibited, since 1) the above approximation is not valid and 2) an accurate $P'(t_k)$ may only be derived from the observation $z_0^k$ and is therefore tightly coupled with the estimation process. Both 1) and 2) are alleviated by introducing a delayed (advanced) by d channel estimate to evaluate the forward (backward) transition metric at time k, since by increasing the decision delay d, the accuracy of the approximation $$E(g_{k-d} | s_k, z_0^{k-d-1}) \approx E(g_{k-d} | z_0^{k-d-1}) = \hat{g}_{k-d|k-d-1} \quad (18)$$

is improved. The resulting recursion equations, summarized in the Appendix, closely resemble those of the KF. The intuitive justification of this technique is that since a probabilistic description of $t_{k-d}$—and consequently $y_{k-d}$—exists, an average $\hat{q}_{k-d|k-d-1} = \Sigma t_{k-d} q_{k-d} P'(t_{k-d})$ may be used in place of $q_{k-d}$ in the KF recursions, thus resulting in what we refer to as an average KF (AKF). The resulting A-SISO, that utilizes a d-lag (d-advanced) soft-decision-directed forward (backward) AKF, is depicted in FIG. 6, and proceeds as follows. The forward metrics at time k are updated as in equation (14a) using the d-delayed channel estimate $\hat{g}_{k-d|k-d-1}$. Starting at time k, a d-step non-adaptive backward recursion is performed, at the end of which, a smoothed soft metric $(P'(t_{k-d}) = P(t_{k-d}|z_0^k)$ is obtained. The latter is now used in the AKF to update $\hat{g}_{k-d|k-d-1}$. A similar one-step adaptive backward/d-step non-adaptive forward recursion is required for the update of the backward quantities.

TCM in Interleaved Frequency-Selective Fading Channels

A. Receiver Structures

As mentioned above, the TCM system may be modeled as a serial concatenation of two FSMs—the outer TCM encoder and the inner ISI channel—through the interleaver.

Figure 7:
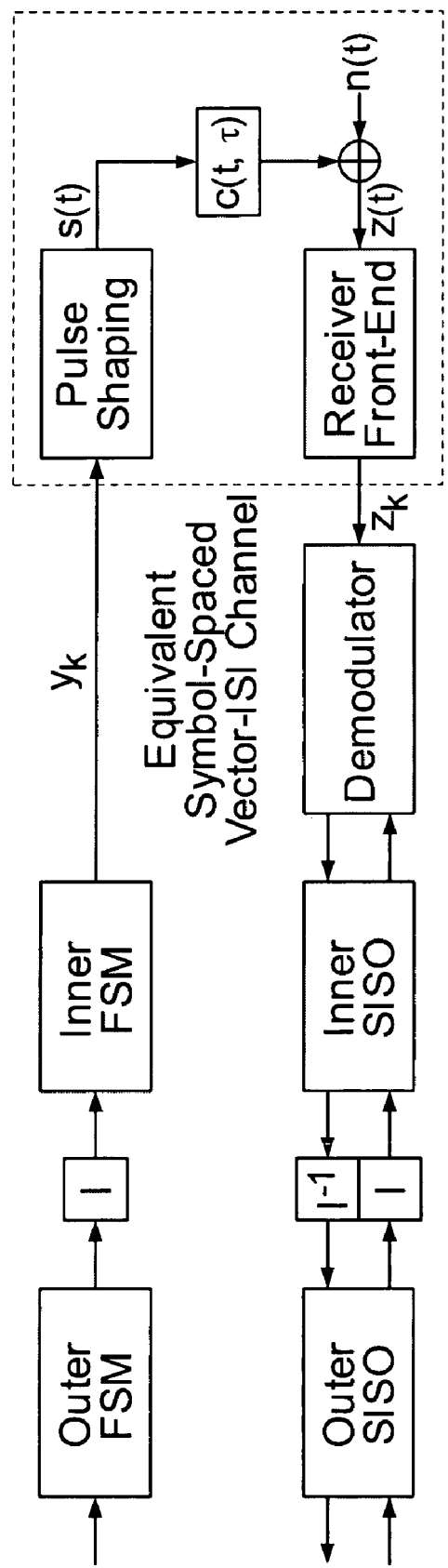
FIG. 7 shows a serial concatenation of FSMs and the associated iterative detection network for the case of perfect CSI.

Three receiver types may be identified for the case of perfect CSI. They included the traditional hard-decision Viterbi equalizer (VE) followed by a Viterbi decoder (VD), as well as the more sophisticated iterative structure shown in FIG. 7. An adaptive receiver may be derived in a straightforward way from the non-adaptive version, by replacing the inner detector (i.e., the equalizer) with its adaptive equivalent, while leaving the outer detector (i.e., the decoder) intact.

Although there are many possible A-SISOs arising from the framework in above section for the soft metrics, only trellis-based techniques are utilized. Several notes on the details of the implementation follow.

1) APP techniques operating in the log domain, result in a small complexity increase compared to MSM. Furthermore, all APP techniques may be constructed from their MSM counterparts by replacing the function in the ACS operation by $\min^* = \min(x,y) - \log(1 + \exp(-|x-y|))$.

2) Trellis-based multiple-estimator structures store and update one estimator per state with zero delay, while single estimator schemes require d backward steps—for every forward step—to provide reliable tentative soft or hard data estimates to update their single estimator.

3) Regarding the particular channel estimator used, the complexity increases in the order LMS, RLS, KF, AKF, PCKF, with the KF and the AKF having almost equal complexity.

4) Optimal binding is, in general, a costly operation (see equations (20) and (21) in the Appendix), while the sub-optimal binding proposed in equation (17) results in a small increase in the adaptive SISO complexity.

5) Forward-only techniques have significantly lower requirements in computation and memory than forward/backward techniques with the same number of states, since they do not require the additional backward recursion and binding. As was discussed above, however, the exponential dependence of complexity and smoothing depth is expected to give rise to much higher overall requirements for forward-only techniques, if the performance of forward/backward techniques is to be obtained.

B. Numerical Results and Discussion

Simulations were run for a transmission scheme comparable to GSM. The convolutionally encoded sequence is interleaved using a 57×30 block interleaver. Each interleaver column is formatted into a TDMA burst together with a training sequence, equally split in 13 leading and 13 trailing symbols. Each burst is modulated and sent over a three-tap equal power Rayleigh fading channel (each tap is assumed independent from the others) with normalized Doppler spread $v_d = 0.005$. Referring back to the generic model in equation (4b), the above-described scenario corresponds to a system with root-raised cosine pulses, symbol-spaced independent fading taps (i.e., $T_r = T$) and a whitened-matched-filter symbol-spaced (i.e., $T_s = T$) receiver FE. Although the decorrelation time of such a channel is much larger than 57 symbols, for the purpose of simulation efficiency, a smaller interleaver depth is used in conjunction with the assumption of burst-to-burst independent channel.

Three systems are considered as follows: i) a rate ½, 16-state coded QPSK system (S1); ii) a rate ⅔, 32-state coded 8PSK system (S2); iii) an uncoded QPSK system (S3). Regarding the naming of the presented techniques, each technique is identified by a four-part label, each part of which denoting: 1) the type of the soft decision (i.e., APP or MSM); 2) the multiplicity of the channel estimators (i.e., SING or MULT); 3) the particular channel estimator used (i.e., KF, RLS, LMS, AKF); and 4) the binding method (i.e., optimal binding (OB), sub-optimal binding (SB), or no binding (NB)). The trellis size of all techniques considered here is chosen to be the same as the size of the underlying FSM trellis.

Figure 8:
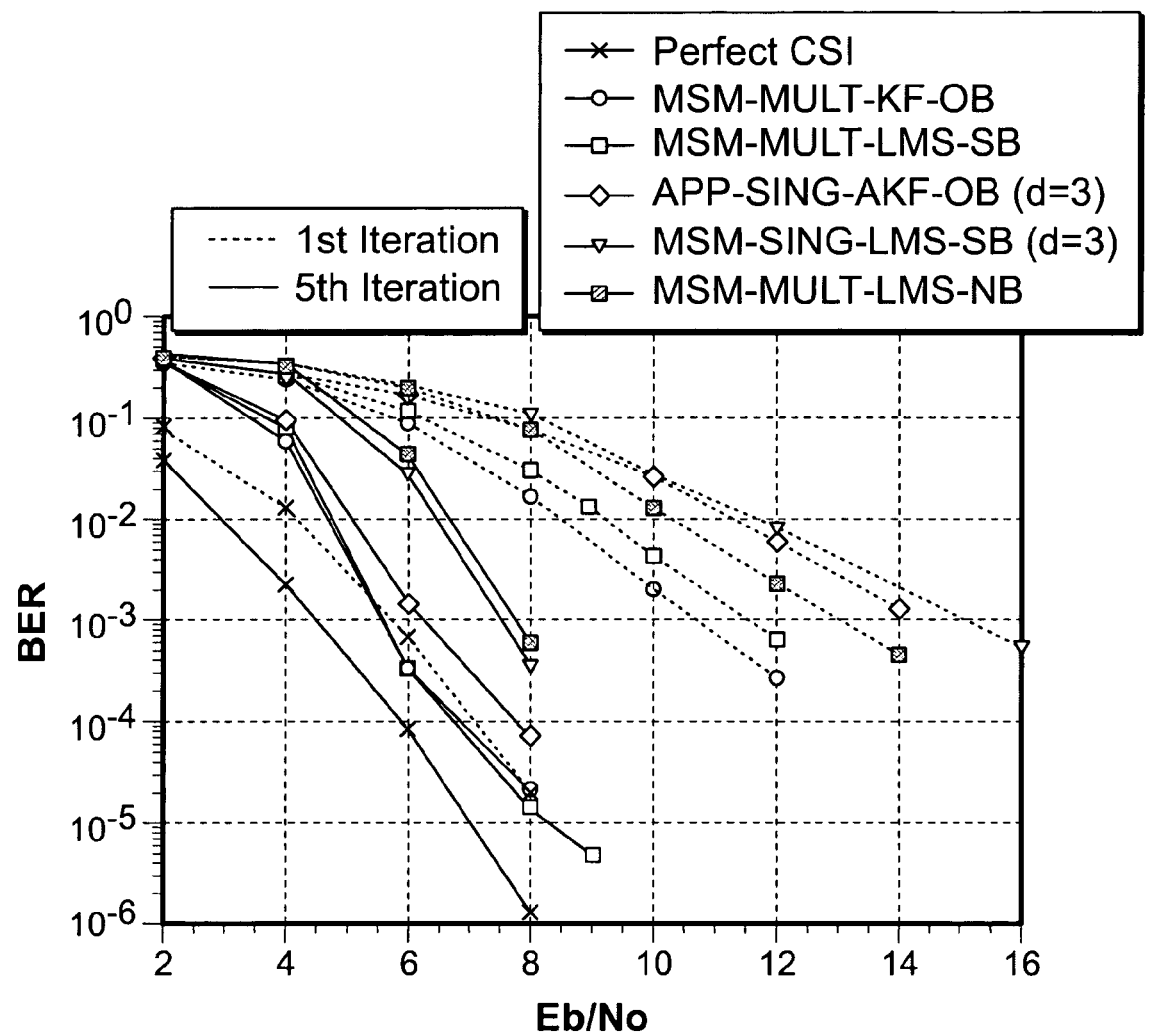
FIG. 8 is a plot of BER vs. $E_b/N_o$ for system S1 and various configurations for inner A-SISO.

FIG. 8 presents performance curves for system S1, employing the iterative receiver described in the previous section with different A-SISOs for the inner equalizer. Bit-error rate (BER) curves for the first and fifth iteration are shown; no significant improvement was observed for more than five iterations. For the A-SISOs employing KF or AKF, the channel estimators were obtained by approximating the Clarke spectrum with a first order model having 10-dB bandwidth equal to $v_d$. Comparing the two curves corresponding to MSM-MULT-LMS, a loss of 2 dB (1 dB) is observed for the fifth (first) iteration when no binding is performed. This outcome clearly indicates the significant practical value of the binding factor. The comparison between MSM-MULT-LMS-SB and MSM-MULT-KF-OB shows that LMS channel estimation with sub-optimal binding is nearly as good as the KF with optimal and computationally expensive-binding. In the first iteration, the latter performs slightly better (by 0.7 dB at BER=$10^{-3}$), while in the fifth iteration, no notable difference is observed. Multiple-estimator schemes are shown to be 2–4 dB better than single-estimator counterparts in the first iteration, while this gain is decreased to 0.5–2 dB after the fifth iteration as can be observed from the comparison of MSM-MULT-LMS-SB and MSM-MULT-KF-OB with MSM-SING-LMS-SB or APP-SING-AKF-OB. Note that the optimal value for the tentative delay was found to be d=3 for both SING estimators. The best A-SISO achieves performance that is just 1 dB away from that of perfect CSI. Regarding the iteration gain, as much as 6–7 dB can be gained using five iterations for both single- or multiple-estimator SISOs. This result is the direct antithesis with the perfect CSI case, where an iteration gain of only 1 dB does not even justify the need for ID. Finally, simulation results confirm the negligible difference between APP and MSM techniques for these operational SNRs.

Figure 9:
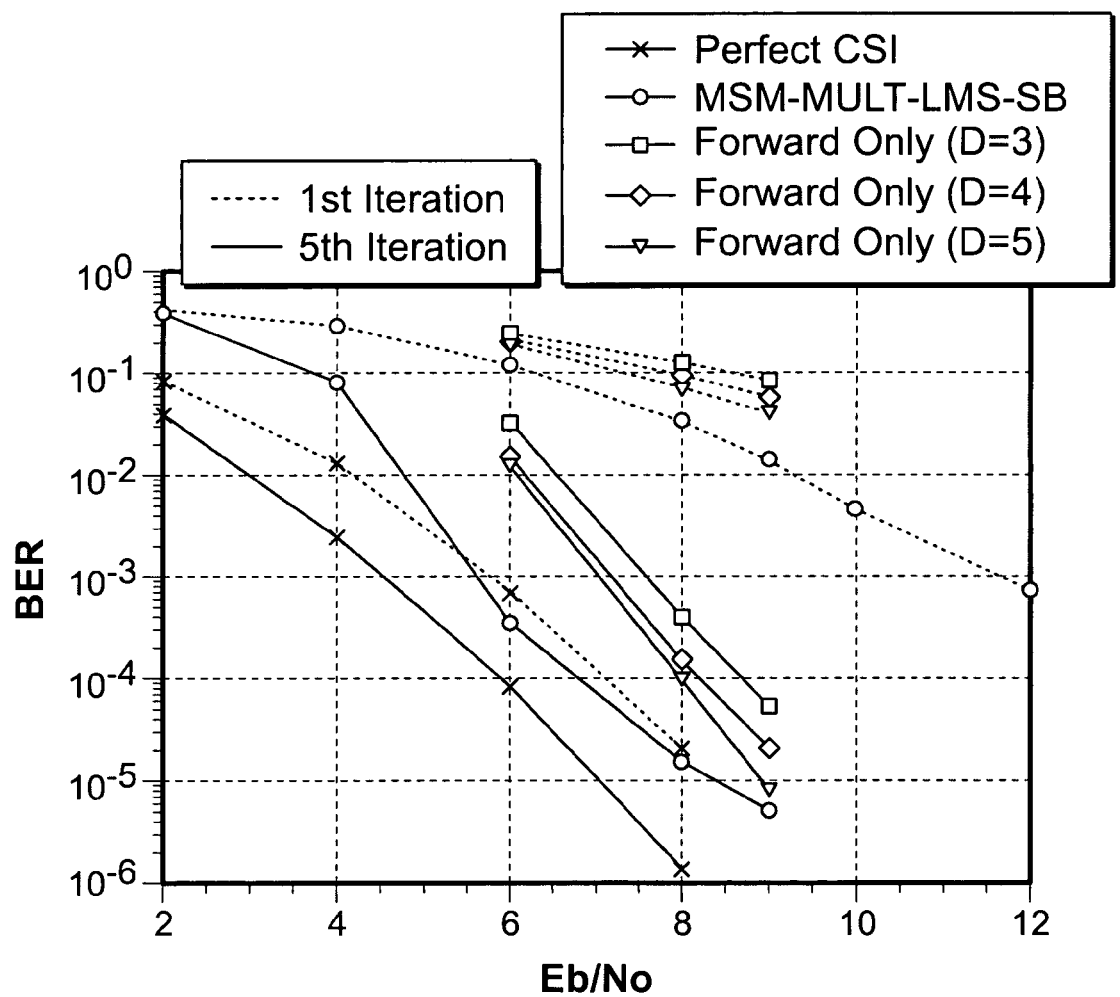
FIG. 9 is a plot of comparison between forward/backward and forward only inner A-SISO for system S1, for various values of the decision lag.

In FIG. 9, the performance of MSM-MULT-LMS-SB of FIG. 5 is compared with that of the corresponding receiver employing a forward-only A-SISO with decision delays and symbols. Other than the different inner A-SISOs, all other components of the compared receivers are identical. As expected, performance is improved by increasing the smoothing depth D, but gives rise to exponential complexity growth. The comparison with the proposed A-SISO shows that even with a high complexity forward-only technique (D=5 corresponds to a 1024-state trellis) a performance gain of 1–1.5 dB may be achieved with the FI A-SISO with only a fraction of the complexity (a forward and a backward recursion on a 16-state trellis is required).

Figure 10:
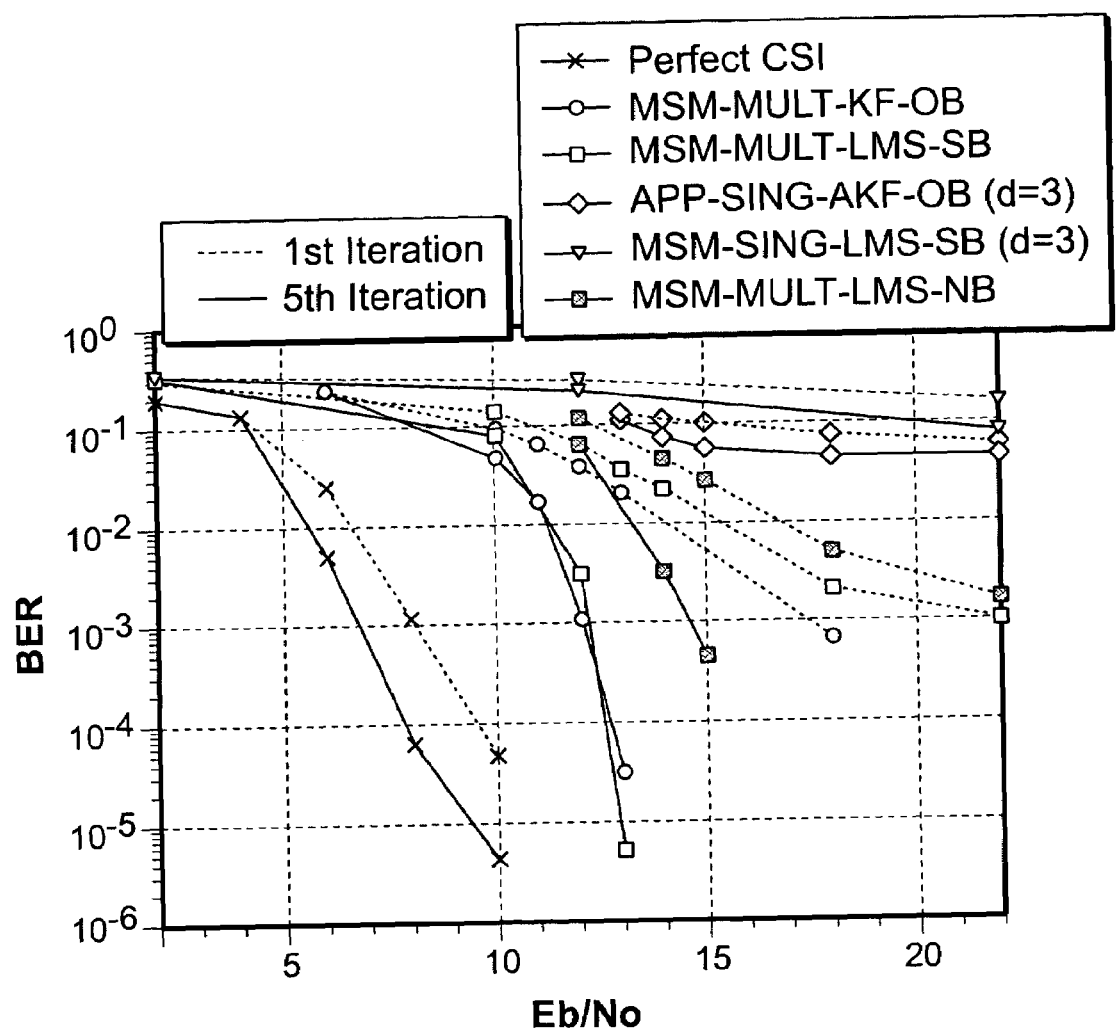
FIG. 10 is a plot of BER vs. $E_b/N_o$ for system S2 and various configurations for inner A-SISO.

Similar performance curves are reproduced in FIG. 10 for system S2 over the same channel as in the previous simulation. The presence of the denser 8-PSK constellation produces quantitatively different performance curves. Single-estimator schemes reach an error floor at BER values greater than $10^{-2}$, regardless of the channel estimator used (i.e., LMS or AKF). Multiple estimator techniques using either KF and OB or LMS and SB perform almost identically at BERs smaller than $10^{-2}$. Both of these adaptive techniques yield much worse performance compared to perfect CSI (the loss is on the order of 5 dB for the fifth iteration for the best A-SISO at BER of $10^{-3}$, while is reduced to approximately 3 dB for a BER of $10^{-5}$).

Figure 11:
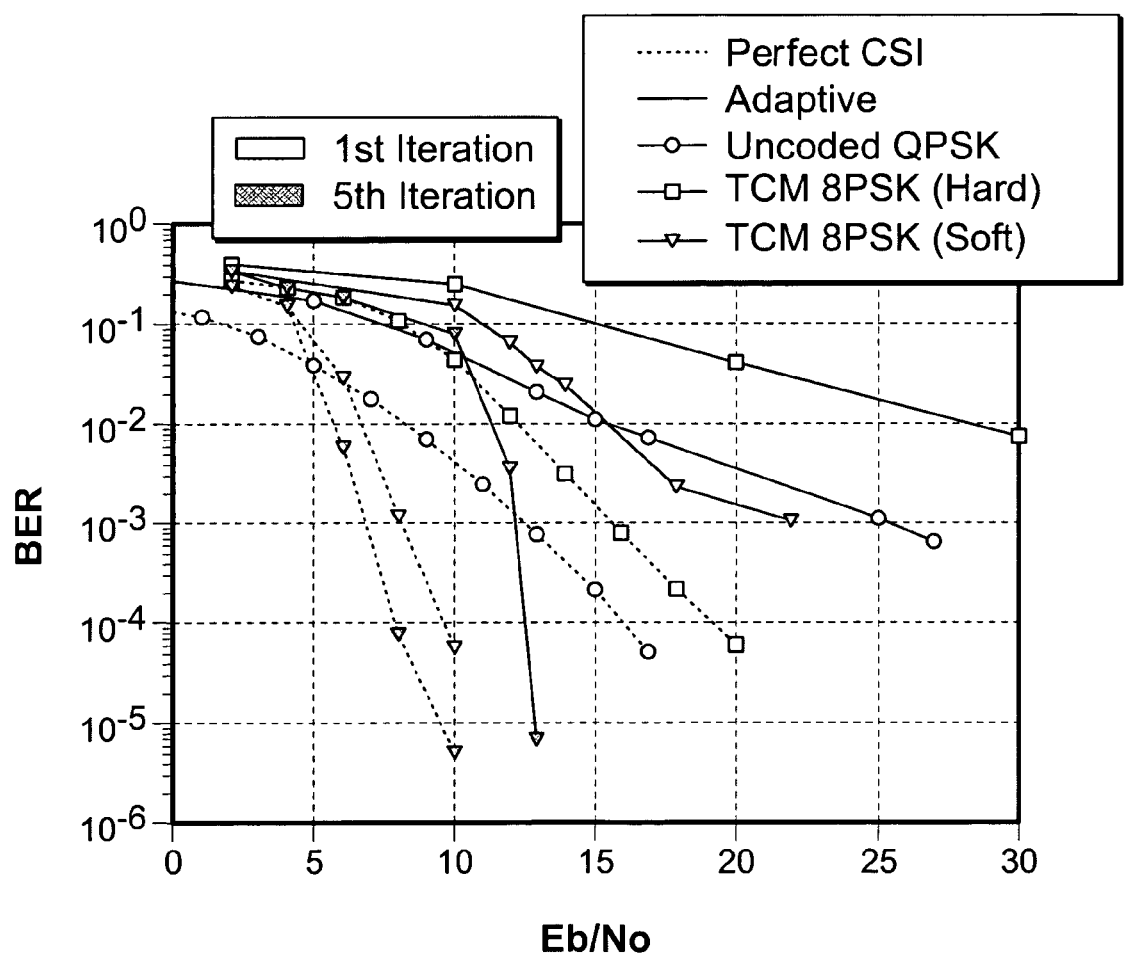
FIG. 11 is a plot of BER vs. $E_b/N_o$ for systems S2 and S3 employing hard-decision and soft-decision decoding BER vs. $E_b/N_o$ for the receiver employing adaptive and non-adaptive (using interpolated channel estimates) inner SISOs for different payload sizes.

Coded modulation techniques have been considered as a method to provide improved performance (i.e., coding gain) with the only cost being increased receiver complexity (i.e., no bandwidth expansion). The design tradeoffs for this frequency selective channel are more complex than those is for an ideal AWGN channel. Those tradeoffs may be studied under the perfect CSI assumption. FIG. 11 presents a comparison between systems S3 (uncoded QPSK) and S2 (8PSK-TCM), both having the same throughput and occupying the same bandwidth. In the AWGN channel, S2 provides a 4.6-dB gain over the uncoded system. Conclusions are obtained for the case of perfect CSI: coding gain without bandwidth expansion is not possible using hard-decision receivers. The utilization of soft-decision receivers results in 4-dB coding gain at a BER of $10^{-3}$ for the first iteration. Additional iterations slightly improve the performance, resulting in 5.5-dB gain at the fifth iteration. When perfect CSI is not available, and adaptive processing is performed, the hard-decision PSP receiver still cannot provide any performance improvement over the uncoded system. Furthermore, the adaptive soft-decision techniques, provides a poor coding gain when only a single iteration is performed (i.e., 3.5 dB). However, the use of iterative soft-decision adaptive processing results in a gain of approximately 13 dB.

C. Factors Impacting Performance

The conclusions drawn in the previous section are tightly coupled with the particular channel conditions and system configuration, and may be significantly altered when different operating conditions are considered. One channel characteristic, that has a significant effect on receiver design, is the level of dynamics (measured by the normalized Doppler spread $v_d$). While high dynamics were considered here, in the case of low dynamics, the need for adaptive processing is questionable; an initial channel estimate may suffice for use in conjunction with a non-adaptive iterative detector. Similar conclusions have been drawn for adaptive hard-decision techniques.

The signaling format, and in particular the configuration of the training sequence, is another system characteristic that has a great impact on receiver design. When only a leading training sequence is available, a more reasonable choice is to use an FL A-SISO. The design of an FL A-SISO is not a trivial extension of the FI scenario presented here, and is a topic of current research.

Figure 12:
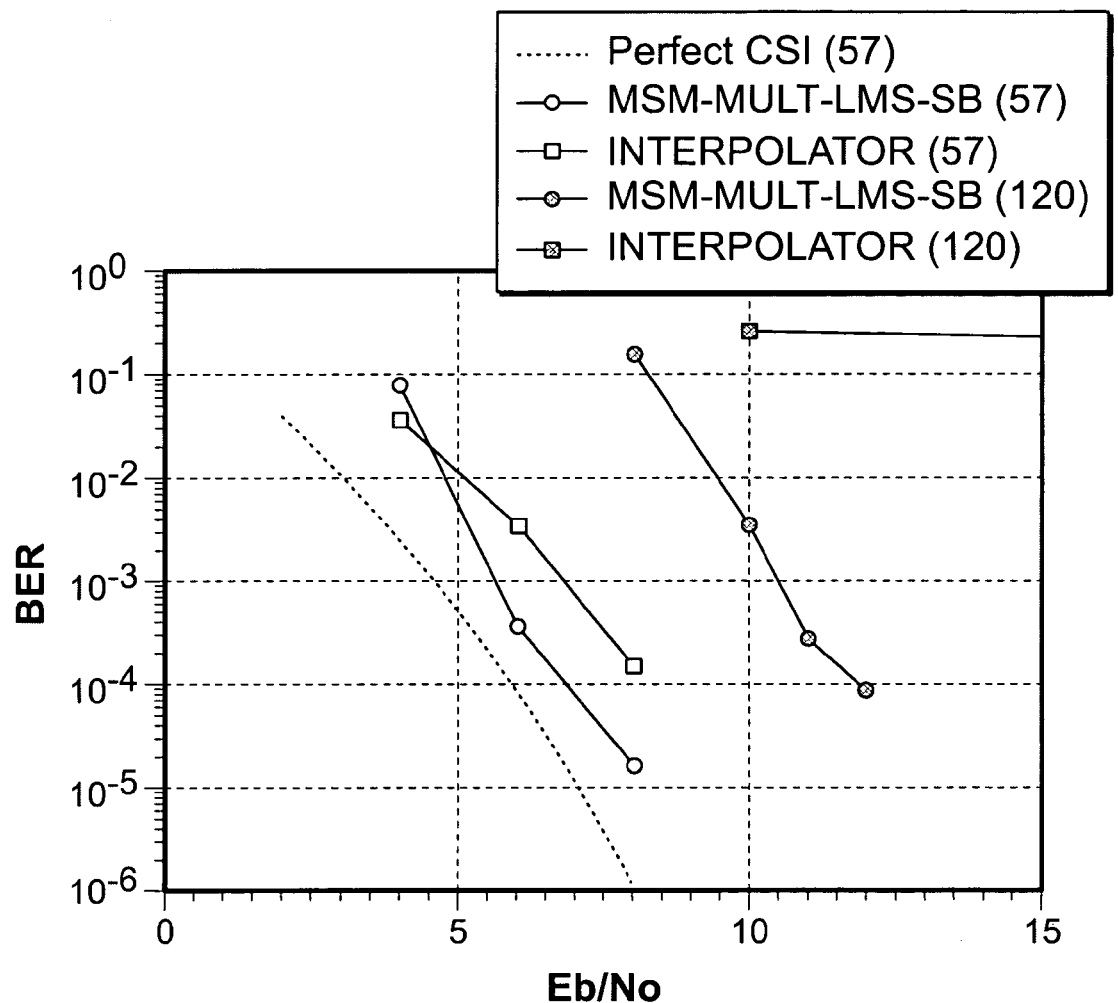
FIG. 12 is a plot of BER vs. $E_b/N_o$ for the receiver employing adaptive and non-adaptive (using interpolated channel estimates) inner SISOs for different payload sizes.

Regarding tracking versus acquisition operating mode, a relevant measure is the product of the payload (i.e., burst) size J with the normalized Doppler spread of the channel $v_d$ (P=J×$v_d$); the smaller the value of P, the lower the probability of loosing lock. For systems operating with small P values, and utilizing leading/trailing training, a low complexity non-adaptive SISO technique derives channel estimates by linear interpolation between the initial and final channel estimates. In FIG. 12, the performance of this scheme is compared with that of MSM-MULT-LMS-SB for system S1. It is shown that the interpolator based non-adaptive SISO operates with 1-dB degradation compared to MSM-MULT-LMS-SB for a BER of $10^{-3}$ and payload size J=57. Unfortunately, such high-performance/low-complexity A-SISO is not feasible when either a trailing training sequence is unavailable or when the value of is increased. The latter is demonstrated in FIG. 12, where the doubling of payload size results in catastrophic performance for the interpolator based SISO.

Figure 17:
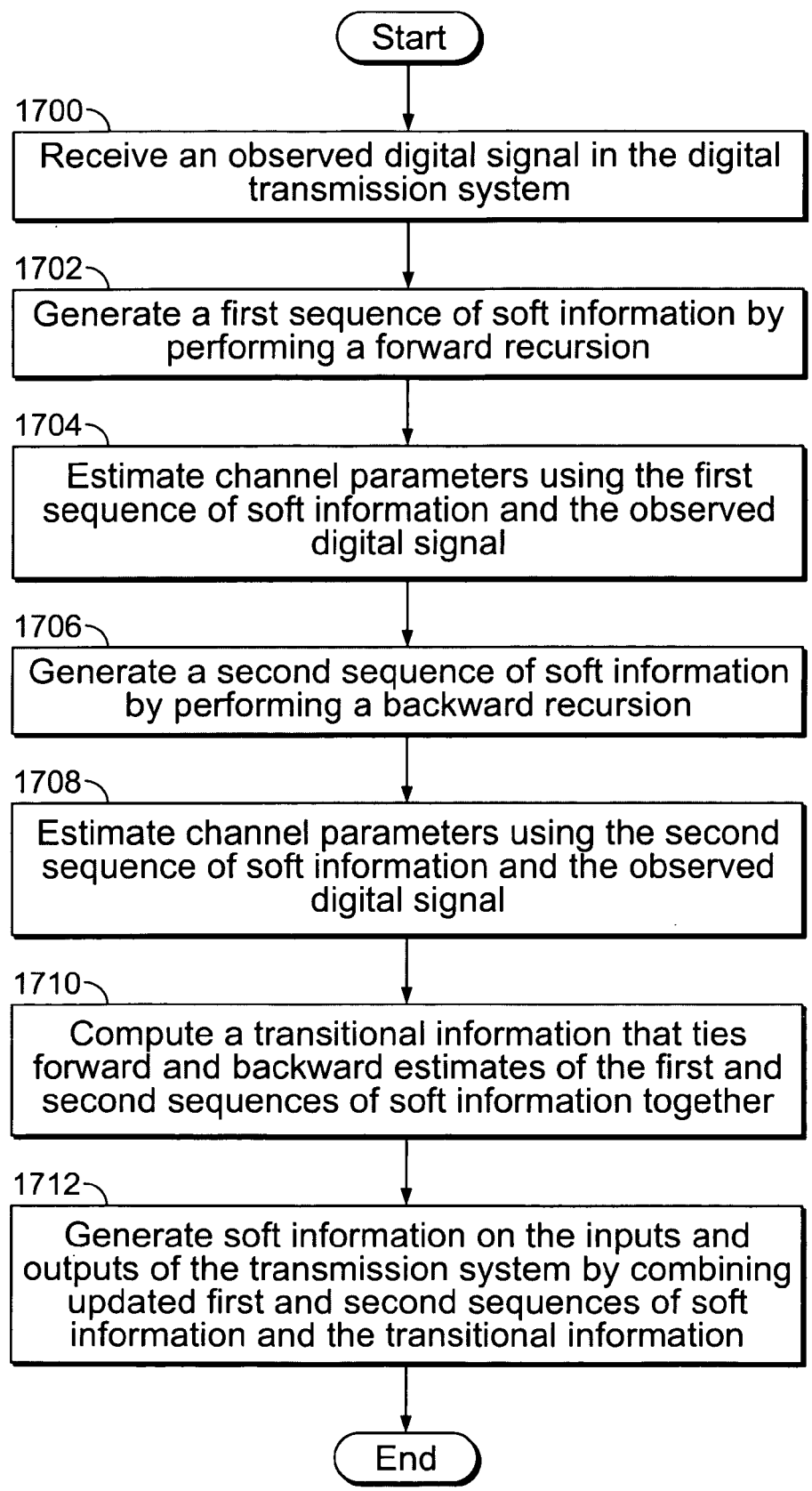
FIG. 17 illustrates a method for estimating inputs and outputs of a digital transmission system.

FIG. 17 illustrates a method for estimating inputs and outputs of a digital transmission system. The method includes receiving an observed digital signal in the digital transmission system (at 1700), generating a first sequence of soft information by performing a forward recursion (at 1702), and estimating channel parameters using the first sequence of soft information and the observed digital signal (at 1704). The method also includes generating a second sequence of soft information by performing a backward recursion, at 1706, and estimating channel parameters using the second sequence of soft information and the observed digital signal, at 1708. A transitional information that ties forward and backward estimates of the first and second sequences of soft information together is computed at 1710. At 1712, soft information on the inputs and outputs of the transmission system is generated by combining updated first and second sequences of soft information and the transitional information.

Adaptive Soft Demodulator

Figure 1C:
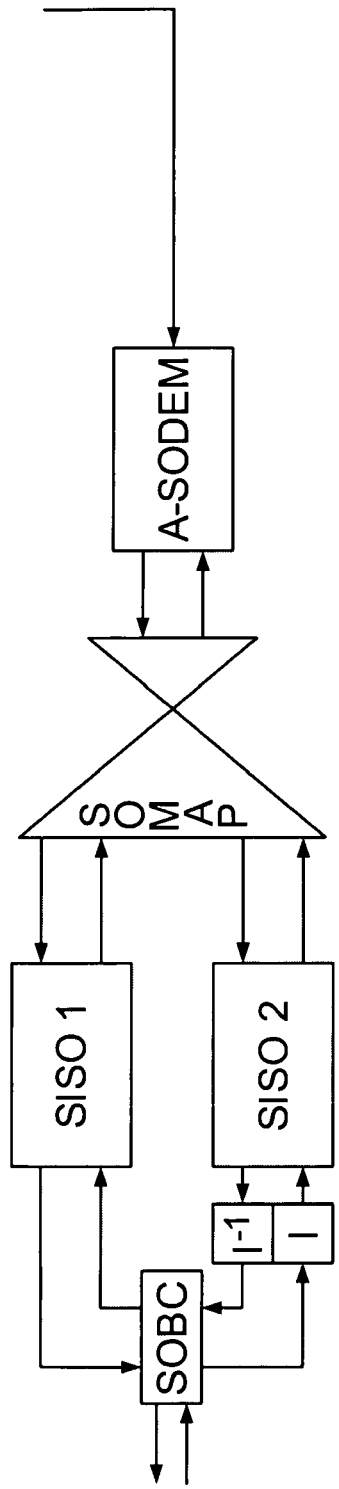
FIG. 1C is an A-SODEM-based iterative receiver.
Figure 2C:
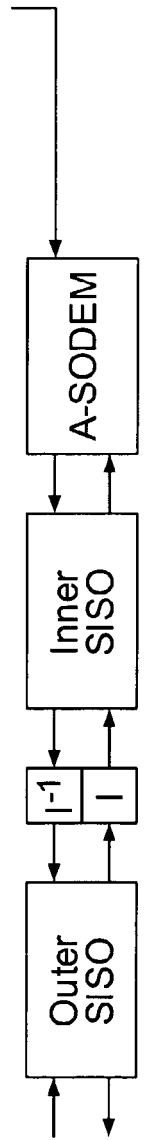
FIG. 2C is an A-SODEM-based iterative receiver.

An Adaptive-Soft Demodulator (A-SODEM) technique provides an alternative approach to the A-SISO technique in building soft inverse blocks. In fact, both are special cases of the adaptive soft inverse with the A-SODEM term used for a single state A-SISO. Under this technique, the estimation process is tied to the detection process through the exchange of soft or hard information between the A-SODEM and the rest of the ID network, as shown in FIGS. 1C and 2C, for PCCC and SCCC, respectively.

In this section, the above approaches to Adaptive Iterative Detection (AID) for phase tracking in PCCC and SCCC systems are considered. A key step is the development of the appropriate Adaptive Soft Inverse (ASI) techniques for phase uncertainty. Initially, recursions for the exact ASI for an FSM with observation that depends linearly on an unknown parameter vector is derived. Approximate ASI techniques for this problem is then motivated. The techniques have the form of an adaptive forward backward technique executed on a fixed-size trellis. ASI modules for phase tracking may be defined. This may yield practical A-SISO and A-SODEM techniques for phase tracking that are used as described above. Finally, these techniques for AID for phase tracking in SCCC and PCCC are applied. The results demonstrate that the substantial gains in performance associated with turbo codes relative to traditional convolutional coding are maintained in the presence of severe phase dynamics when a well-designed AID scheme is used.

Theoretical Framework for ASI Techniques

Consider a system with input $x_k \in A_x = \{0, 1, \ldots, N_x-1\}$, and output at time k observed indirectly, through a function which also involves an unknown vector-parameter g. Furthermore, assume that the observation $z_k$ is a linear function of g:

$$z_k = f(x_0^n)^T g + n_k = q_k^T g + n_k \quad (19)$$

where $n_k$ is complex circular Additive White Gaussian Noise (AWGN) with $E\{|n_k|^2\} = N_0$, and $q_k = f(x_0^n)$ is a size L complex vector depending on the modulation format, drawn from a constellation of size Q, and possibly depending on the entire input sequence $x_0^n$.

Based on the sort of information exchanged, a soft inverse technique can be classified as a posteriori probability (APP) or Minimum Sequence Metric (MSM). Whenever perfect CSI is not available at the receiver, similar quantities may be evaluated by either averaging, or maximizing over the unknown parameter. For a generic quantity $u_k$, and assuming that g is modeled as a deterministic unknown constant vector, we define the APP and MSM ASI as a system that outputs $$APP(u_k) \stackrel{def}{=} c \sum_{x_0^n : u_k} \max_g P(z_0^n, x_0^n | g) \quad (20a)$$

$$MSM(u_k) \stackrel{def}{=} c' - \log\left[\max_{x_0^n : u_k} \max_g P(z_0^n, x_0^n | g)\right] \quad (20b)$$

where $x_0^n : u_k$ denotes all sequences $x_0^n$ consistent with $u_k$, and c,c' are normalizing constants. These soft outputs are direct generalizations of the well-known perfect-CSI soft outputs for the case of unknown deterministic parameters. In substantially all cases, the soft outputs may be derived from the quantity $\max_g P(z_0^n, x_0^n | g)$ by either averaging or maximizing—for APP(•) or MSM(•) respectively—over the nuisance parameters $x_0^n : u_k$.

A. Exact Evaluation of the ASI for FSM: A-SISO Technique

In this section, the derivation of the exact ASI for an FSM with observation that is a linear function of an unknown parameter vector is summarized. Specifically, bi-directional recursions for the quantities in equation (20) may be obtained.

Consider an FSM with input $x_k$, state $s_k$—together constituting the transition $t_k = (s_k, x_k)$—and output $y_k$, where each integer quantity $u_k$ (i.e., $x_k$, $y_k$, $s_k$, or $t_k$) is assumed to take values in the set. The observation equation is given by equation (19) specialized to $q_k = f(x_k, s_k) = f(y_k)$, where $q_k$ depends on the input sequence only through the FSM output $y_k$.

For the evaluation of $\max_g P(z_0^n, x_0^n | g)$ (the summation/maximization over $x_0^n : u_k$ is done in a later stage), we choose to work in the log domain with the metric $$-\log P(z_0^n, x_0^n | g) = -\log P(z_0^n | x_0^n, g) P(x_0^n) \quad (21)$$

$$= -\log \prod_{m=0}^{n} N(z_m; q_m^T g; N_0) p(x_m)$$

$$= c'' + \sum_{m=0}^{n} \frac{|z_m - q_m^T g|^2}{N_0} - \log P(x_m)$$

where $N(z; m; \sigma^2)$ denotes the probability density function of a complex circular Gaussian random variable with mean m, and variance $\sigma^2/2$ for the real and imaginary parts. The constant term c'' is dropped and the metric is slightly generalized by introducing an exponentially decaying window relative to time k with forgetting factor p. This weighting provides increased numerical stability as well as the ability to track slow parameter variations. Maximization over the unknown parameter g, required in equation (20), is equivalent to $$\Lambda(z_0^n, x_0^n) = \min_g \left\{ \sum_{m=0}^{k} \left[ \frac{|z_m - g_m^T g|^2}{N_0} - \log P(x_m) \right] \rho^{k-m} + \sum_{m=k+1}^{n} \left[ \frac{|z_m - q_m^T g|^2}{N_0} - \log P(x_m) \right] \rho^{m-k} \right\} \quad (22)$$

The key to deriving the exact expression for $\Lambda(z_0^n;x_0^n)$ is the fact that the solution $\tilde{g}$ to the least squares minimization problem in equation (22) may be written in terms of a forward $\tilde{g}_k$ and a backward $\tilde{g}_{k+1}^b$ estimate, depending on the observation $z_0^k$ and $z_{k+1}^n$ respectively. The final result is summarized in the following set of equations $$\Lambda(z_0^n; x_0^n) = \Lambda(z_0^k; x_0^k) + \rho \Lambda^b(z_{k+1}^n; s_{k+1}, x_{k+1}^n) + b(\cdot) \quad (23a)$$

$$\Lambda(z_0^k; x_0^k) = \rho \Lambda(z_0^{k-1}; x_0^{k-1}) - \log P(x_k) + \frac{\rho}{\rho + q_k^T \tilde{P}_{k-1} q_k^*} \frac{|z_k - q_k^T \tilde{g}_{k-1}|^2}{N_0} \quad (23b)$$

$$\Lambda^b(z_{k+1}^n; s_{k+1}, x_{k+1}^n) = \rho \Lambda^b(z_{k+2}^n; s_{k+2}, x_{k+2}^n) - \log P(x_{k+1}) + \frac{\rho}{\rho + q_{k+1}^T \tilde{P}_{k+2}^b q_{k+1}^*} \frac{|z_{k+1} - q_{k+1}^T \tilde{g}_{k+2}^b|^2}{N_0} \quad (23c)$$

where $\tilde{g}_k$, $\tilde{g}_{k+1}^b$, $\tilde{P}_k$ and $\tilde{P}_{k+1}^b$ are the forward and backward Recursive Least Squares (RLS) estimates and corresponding information matrices, respectively. Both the forward and backward RLS estimates defined above are implicit functions of the input sequence $x_0^k$ and $x_{k+1}^n$, respectively. Finally, the binding term $b(\bullet)$ is given by $$b(\cdot) = \frac{1}{N_0} \left[ \|\tilde{g}_{k+1}^b + g_c\|_{\tilde{P}_k^{-1}}^2 + \rho \|\tilde{g}_k + g_c\|_{\tilde{P}_{k+1}^{b-1}}^2 \right] \quad (23d)$$

$$g_c = -\tilde{P}_k \left[ \tilde{P}_k + \frac{1}{\rho} \tilde{P}_{k+1}^b \right]^{-1} \tilde{g}_k - \frac{1}{\rho} \tilde{P}_{k+1}^b \left[ \tilde{P}_k + \frac{1}{\rho} \tilde{P}_{k+1}^b \right]^{-1} \tilde{g}_{k+1}^b \quad (23e)$$

where $\|x\|_A^2 = x^+ A x$, $x^+$ denotes complex conjugate and transpose, and $g_c$ is the smoothed Least Squares estimate.

Note that the recursions in equation (23), which is a novel way of calculating the residual metric of a RLS smoother, are very similar to those of the standard forward-backward SISO technique, with the exception of the existence of a binding term in equation (23d). However, the forward recursion depends on the entire path history $x_0^k$ and the backward recursion depends on all the entire conditioned future $s_{k+1}, x_{k+1}^n$. Thus, exhaustive combining and marginalization is required to compute the ASI (i.e., equation (20)) when parametric uncertainty is present. However, the bi-direction form of the recursions in equation (23) is useful for motivation of practical approximations.

B. Exact Evaluation of the ASI for a Memory-Less Mapping: The A-SODEM Technique

The ASI of the subsystem including the modulator and the channel, namely the A-SODEM, may now be derived. The starting point of the derivation of such a technique is the observation equation (19), specialized to $q_k = f(x_k)$. Note that this is a special case of the FSM model assumed above. Thus, the results in equation (23) are applicable. Note that, even though the mapping is memory-less, the ASI requires memory (i.e., exhaustive combining and marginalization) due to unknown parameter g.

Practical ASI Techniques for Phase Tracking in Turbo Codes

As may be seen from FIGS. 1A and 2A, the encoded complex symbols $q_k$ are transmitted to an AWGN channel, which introduces phase offset $\theta_k$, as well, resulting in the following complex baseband model $$z_k = \sqrt{E_s} q_k e^{j\theta_k} + n_k \quad (24)$$

where $E_s$, is the symbol energy, and the symbols $q_k$ are normalized to unit energy.

A. Practical A-SISO Techniques

It was demonstrated above that the main components of the optimal A-SISO technique described in equation (23) for the specific modeling assumption for the unknown parameter are: (i) the metric update mechanism on a forward and a backward tree, (ii) the sequence conditioned forward and backward RLS estimators, and (iii) the binding of the forward and backward metrics. Since each of these components is either associated with extreme complexity, or is tightly related to the specific model, several options are discussed for the design of practical A-SISOs.

Regarding the complexity associated with the tree search, among the possible solutions, one desirable sub-optimal solution emerges when force-folding the tree into a fixed complexity trellis, and applying the Viterbi Algorithm (VA) to update the metrics. In addition, the Per-Survivor Processing (PSP) principle, or the Decision Feedback (DF) assumption may be applied as a mechanism to update the parameter estimates. Furthermore, the RLS per-path estimators may be substituted by per-state generic parameter estimators, suited for the specific parameter model.

The resulting technique, shown in FIG. 6, and described in Appendix B, include forward and backward recursions similar to the ones performed in the forward-backward SISO for perfect CSI, aided by multiple (i.e., one for each state) parameter estimators. Each recursion requires Add-Compare-Select (ACS) or Product-Sum (PS) operations to be performed on a state trellis for MSM and APP soft metrics, respectively, as well as parameter updates.

The trellis on which this technique operates is not tightly related to the FSM trellis. In fact, the notion of the state $s_k$ and transition $t_k$ may be generalized to longer sequence portions leading to expressions identical to equation (23). As an example, a superstate and super-transition may be defined as $s_k^s = (t_{k-K}, \ldots, t_{k-1}, s_k)$ and $t_k^s = (t_{k-K}, \ldots, t_k)$ for arbitrary K. The term K is a design parameter that determines the amount of pruning in the forward and backward trees, and eventually, the complexity of the technique. This technique has been used extensively in the problem of data detection in the presence of unknown parameters. At the limit, when K is equal to the entire sequence length n, the corresponding A-SISO exactly evaluates the APP, MSM metrics in equations (20a) and (20b).

By inducing a delay (advance) in the decision feedback of the forward (backward) recursion, single estimator A-SISOs may be derived resulting in the structure shown in FIG. 6. Forward and backward recursions are performed on the FSM trellis, aided by a single forward and backward parameter estimator. The required tentative hard or soft d-delayed (d-advanced) decisions are provided by either a d-step hard-decision trace back, or a d-step backward (forward), non-adaptive recursion on the state trellis.

There are two ways that the framework established in Theoretical Framework Section to motivate practical ASI modules for the case of the phase tracking may be used. One approach is to modify the observation equation in equation (24) to obtain a linear model as in equation (19) using $g=e^{j\theta_k}$, where g is a complex amplitude parameter. With this modification, instead of estimating the physical parameter $\theta_k$, the complex amplitude g is estimated. Another approach is to maintain the non-linear observation equation and replace the parameter estimators in the A-SISO or A-SODEM by some non-linear estimator. For example, an Extended Kalman Filter (EKF) or a Phase-Locked Loop (PLL) may be used. In the present disclosure, the latter approach is considered. Regarding the channel estimator, a simple first order Decision Directed PLL (DD-PLL) is used in place of the RLS technique with noise equivalent bandwidth (normalized to the symbol time) $B_{eq}=\lambda/(4-2\lambda)$, $$\hat{\theta}_k = \hat{\theta}_{k-1} + \lambda \Im\{z_k q_k^* e^{-j\hat{\theta}_{k-1}}\} \quad (25)$$

and similarly for the backward estimate $\theta_{k+1}{}^b$.

In addition, it is desirable to reduce the complexity in the forward equation (23b), backward equation (23c), and update equation (23d). One such simplification leads to the following approximations $$\Lambda(z_0^k; x_0^k) = \Lambda(z_0^{k-1}; x_0^{k-1}) - \log P(x_k) + \frac{|z_k - q_k e^{j\hat{\theta}_{k-1}}|^2}{N_0} \quad (26a)$$

$$\Lambda^b(z_{k+1}^n; s_{k+1}, x_{k+1}^n) = \quad (26b)$$

$$\Lambda^b(z_{k+2}^n; s_{k+2}, x_{k+2}^n) - \log P(x_{k+1}) + \frac{|z_{k+1} - q_{k+1} e^{j\hat{\theta}_{k+2}^b}|^2}{N_0}$$

$$b(\tilde{\theta}_k, \tilde{\theta}_k^b) = \frac{1-\lambda}{\lambda(2-\lambda)} \frac{|e^{j\tilde{\theta}_k} - e^{j\tilde{\theta}_k^b}|^2}{N_0} \quad (26c)$$

We note that this last equation is not exact; it was obtained intuitively by observing the properties of equation (23d). The above equation provides additional insight on the role of the binding term: If the forward and backward channel estimates corresponding to a particular sequence are not consistent, a penalty is paid by means of increasing the sequence metric. Furthermore, this penalty is amplified when tracking slowly changing parameters ($\lambda$ close to 0).

B. Practical A-SODEM Techniques

Having establish the parallel between A-SODEM and A-SISO, namely that the A-SODEM is an A-SISO operating on a specially defined FSM, simplifications discussed in the previous section may be applied in this case as well. In particular, defining the super-state $s_k^s=(x_{k-K}, \ldots, x_{k-1})$, a family of practical techniques may be derived in a straight-forward way having structure similar to the A-SISOs shown in FIG. 6, including forward and backward processing with per-state parameter estimation.

The simplest case of K=0 may be of particular interest, since this will provide useful links with existing adaptive techniques. Under this simplifying assumption, the FSM trellis reduces to a single-state trellis with $N_x$ parallel transitions. The A-SODEM technique is described by a set of forward/backward and binding equations, where the dependency of the forward $\Lambda(z_0^k)$ and backward $\theta^b(z_{k+1}^n)$ metrics on the input sequence $\{x_k\}$ may be dropped. Furthermore, concentrating on the forward recursions, the values for $q_k$—or equivalently $x_k$—required in equation (25) by the DD-PLL to update $\tilde{\theta}_k$, are provided by instantaneous decision feedback based on the current metrics $\theta(z_0^k)$. The resulting family of A-SODEMs is described in Appendix C.

Different variations of the technique described in Appendix C (i.e., no binding and forward-only recursions are such variations) may also be envisioned. An additional option is to hard quantize the new a-priori information $P(x_k)$ to generate hard estimates $\hat{x}_k$ (or equivalently $\hat{q}_k$). In this case, the metric update step 1) in Appendix C simplifies to Metric update: $\alpha_{k+1} = \alpha_k + |z_k - \hat{q}_k e^{j\tilde{\theta}_{k-1}}|^2$ and $\hat{q}_k$ is used in the DD-PLL to update $\tilde{\theta}_k$. Similar simplifications are performed in the backward step 2). If the a-priori information $P(x_k)$ is not utilized at all, the above phase estimation technique is a non-iterative scheme which needs to be activated only once, before the iterative decoding process.

SCCC with Carrier Phase Tracking

As shown in FIG. 2A, in a SCCC the sequence of source bits $b_n$, is partitioned into blocks and convolutionally encoded using a rate $R_O$ outer CC, producing N coded symbols $x_n$. These symbols are fed to an inner CC of rate $R_i$ through a pseudorandom symbol interleaver of length N. The output symbols $y_k$ are mapped onto a constellation of size Q, resulting in an overall code rate of $R=R_O R_i \log_2 Q$ (bits per channel use). The complex symbols $q_k$ are transmitted through an AWGN channel, resulting in the complex baseband model of equation (24).

The effectiveness of the adaptive iterative detection technique may be assessed by a number of factors. For example, loss of lock probability, tracking bandwidth and BER in the tracking mode are all relevant performance measures. Initial experiments suggested that cycle slipping was a major performance limiting factor. This is because the operating SNR is very low and the block length (interleaver size) is large. Thus, the insertion of pilot symbols may be considered.

In particular, $N_t$ pilot symbols are inserted in the transmitted sequence for every $N_d$ coded symbols. The energy lost in the redundant pilot symbols is accounted for by lowering the transmitted symbol energy as $$E_s = R R_t E_b = R_O R_i \log_2 Q \frac{N_d}{N_d + N_t} E_b \quad (27)$$

where $E_b$ is the energy per information bit.

A. Receivers

Figure 2D:
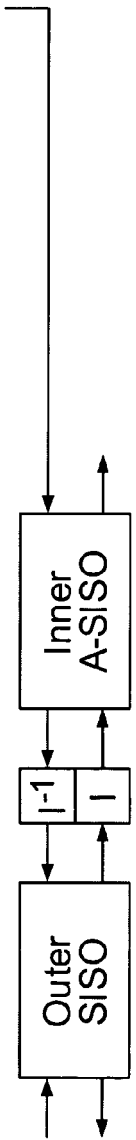
FIG. 2D is an A-SISO-based iterative receiver.

The structure of a SCCC is one of a serial concatenation of two FSMs through an interleaver and therefore it permits the iterative receiver shown in FIG. 2B for the case of perfect CSI. Similarly, the block diagram of the iterative receiver that utilizes an A-SODEM and inner and outer non-adaptive SISOs is shown in FIG. 2C, while the A-SISO based receiver is shown in FIG. 2D.

Utilizing the DD-PLL estimator of equation (25), the forward/backward equations, and the binding term in equation (26), A-SISO- or A-SODEM-based receivers are constructed and their performance under different operating scenarios is simulated in the next section. A baseline adaptive decoder, that may be derived for PCCCs, is also considered. It includes a single DD-PLL which uses decisions on the raw output symbols $q_k$, as well as the pilot symbols, to obtain a phase estimate and consequently derotate the observation; however, no feedback information on $y_k$ from the inner SISO is utilized. A standard iterative decoder is then employed on the derotated observation—after discarding the pilot symbols—to produce final decisions on the source bits. Note that, in such a segregated system the channel estimator (DD-PLL) does not use any information on the structure of the output sequence $\{y_k\}$ due to the underlying code and is run only once prior to the initial iteration.

B. Numerical Results

The SCCC system is simulated in this section. It includes an outer 4-state, rate ½ RSC connected through a length N=16384 symbol pseudo-random interleaver to an inner 4-state, rate ⅔ RSC. The corresponding generator matrices are given by $$G_{outer}(D) = \left[1 \frac{1+D^2}{1+D+D^2}\right] G_{inner}(D) = \begin{bmatrix} 10\frac{1+D^2}{1+D+D^2} \\ 01\frac{1+D}{1+D+D^2} \end{bmatrix}$$

The output symbols are mapped to an 8PSK constellation with Gray encoding, resulting in an overall code rate R=½× ⅔×log$_2$8=1. The phase process is generated as a random walk $$\theta_k = \theta_{k-1} + \phi_k \tag{28}$$

where $\phi_k$ is a Gaussian increment of zero mean and variance $\sigma_\phi^2$. Only APP-type SISOs are considered here since the SNR loss of 0.5 dB to 0.7 dB experienced by the MSM-type techniques is crucial in this application. In addition, the A-SISO trellis size is the one implied by the corresponding FSM, i.e., no super-state-based A-SISOs are examined. The receivers including the inner A-SISOs are labeled as A-SISO-SING/MULT-SB/NB, corresponding to single or multiple DD-PLLs and sub-optimal binding of equation (26c), or no binding respectively. Among the A-SODEM-based receivers two special cases are considered: (i) the single-state A-SODEM described in Appendix C (labeled A-SODEM), and (ii) a single-state A-SODEM variant with forward-only recursions and no binding (labeled A-SODEM-FW). Finally, the baseline technique including a single external DD-PLL operating on the raw 8PSK symbols will be labeled EXT (i.e., external PLL). In all simulations presented here, the initial and final phase estimates are assumed ideal. Consequently, for a fair comparison between the External PLL receiver and the proposed receiver structures, a forward PLL starting at the beginning of the block is used to derotate the first half of the observation, while a backward PLL starting at the end of the block is used for the second half of the observation. With such a scheme, the knowledge of both the initial and the final phase is utilized by the External PLL receiver. Note that interpolation between phase estimates obtained using the Nd-separated pilot symbols was found to perform poorly under all operational scenarios presented.

Figure 13:
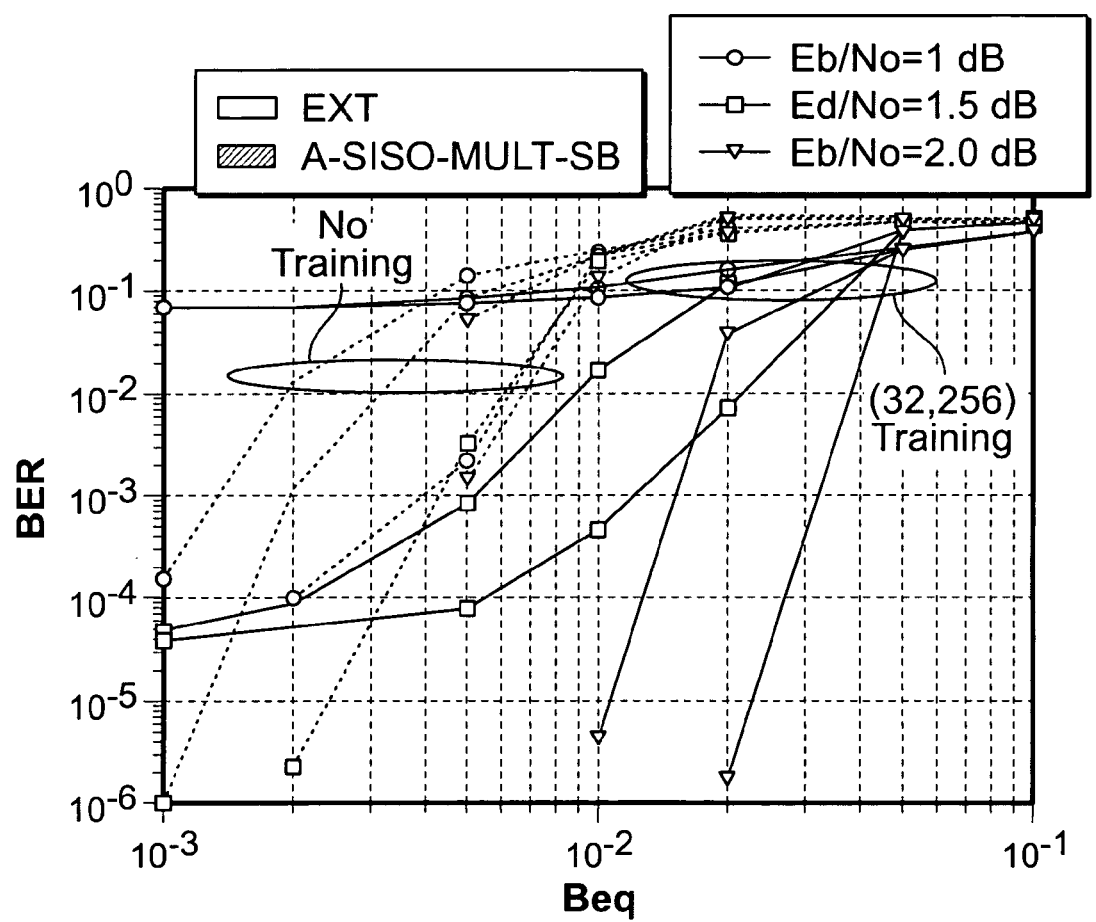
FIG. 13 is a plot of BER vs. loop bandwidth for the SCCC static phase.

In FIG. 13 the BER is plotted versus the loop bandwidth $B_{eq}$ for the case of the true phase process being static ($\sigma_\phi=0$). A large value of $B_{eq}$ suggests the ability to track larger phase dynamics. The comparison of EXT and A-SISO-MULT-SB curves leads to different conclusions depending on the bandwidth range. In the low loop-bandwidth range ($B_{eq} \leq 10^{-3}$) the two receivers perform substantially identically, approaching the perfect CSI performance, thus the External PLL receiver suffices. For medium and high loop-bandwidth ($B_{eq} \leq 10^{-3}$) a clear advantage of the A-SISO-MULT-SB may be observed over the EXT receiver. In particular, the simulations show that with the proposed technique the PLL bandwidth may be increased two to three times.

Regarding the comparison between pilot-aided and non-pilot-aided, the basic trade-off is controlled by the parameter $N_t$ (for fixed $N_d$) by increasing $N_t$, better tracking is possible, while the symbol energy $E_s$ is reduced as reflected in equation (27). In the one extreme, no pilots are introduced ($N_t$=0), resulting in high probability of cycle slipping at moderate phase dynamics. In the other extreme ($R_t$<<1), the SNR loss nullifies any performance gain due to the improved phase estimate. Two practical cases are shown in FIG. 13: non-pilot-aided and ($N_t,N_d$)=(32,256) pilot-aided transmission. At low $E_b/N_0$ (i.e. 1 dB) the non-pilot-aided system is superior since pilots introduce an energy loss of $-10 \log_{10} R_t$=0.51 dB, reducing the effective $E_s/N_0$ to 1–0.51=0.49 dB, which results in poor performance even in the coherent case. At medium $E_b/N_0$ (i.e., 1.5 dB) the trade-off is reversed, generating a two to three-fold advantage of the pilot-aided system over the non-pilot-aided one in terms of $B_{eq}$. This behavior is attributed to the fact that the former system is able to maintain phase lock for wider loop bandwidths. Finally, at large $E_b/N_0$ values (i.e., 2 dB), the superiority of the pilot-aided system is even more evident, giving rise to as much as five to seven times increase in $B_{eq}$, and achieving even lower BER. The above comparisons raise the issue of proper selection of the system parameter ($N_t,N_d$). The design procedure is initiated by setting a target BER and $B_{eq}$ region. A search procedure is then followed, in the process of which, $E_b/N_0$ and $N_t$ are gradually increased until the target (BER, $B_{eq}$) pair is reached. Regarding the selection of $N_d$, it should be smaller than the average time-to-slip or else the performance will be dominated by cycle slips.

Figure 14:
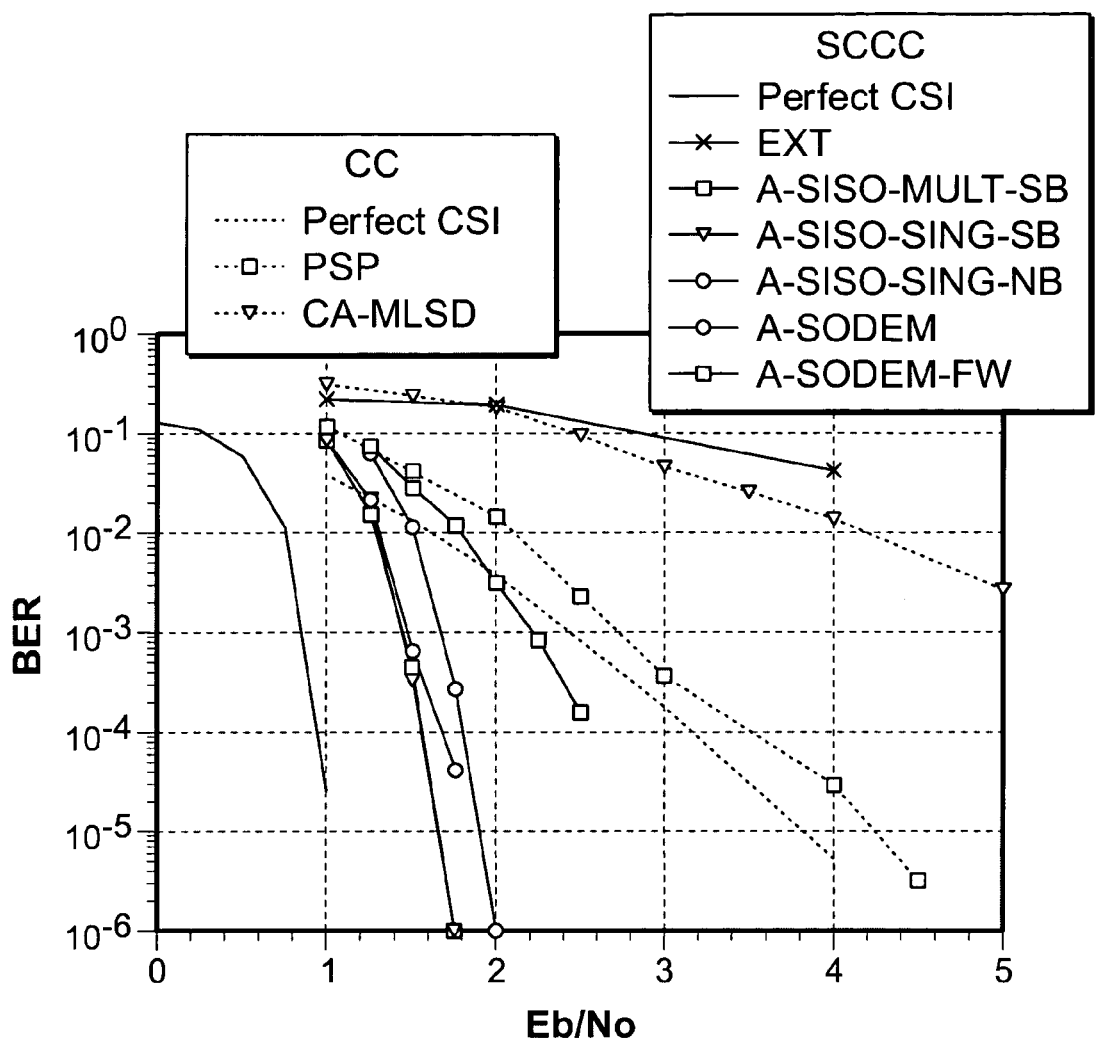
FIG. 14 is a plot of BER vs. $E_b/N_o$ SCCC with phase dynamics and various inner A-SISO and A-SODEM configurations (the optimal performance for SING receivers was achieved for d=0).

FIG. 14 shows a comparison of the SCCC system with the industry standard rate ½, 128-state CC, in the more realistic scenario that includes phase dynamics. The CC output is mapped on a QPSK alphabet resulting in a rate R=1 (bits per channel use) code (no pilot symbols are used). MLSD with the aid of a VA is performed in the coherent case, while two adaptive receiver structures are considered. The first is the Conventional Adaptive-MLSD (CA-MLSD) receiver including a single DD-PLL driven by delayed tentative decisions from the VA. The second is a PSP-based receiver having a VA with 128 DD-PLLs driven with zero-delay decisions. The SCCC receivers considered are the EXT, A-SODEM, A-SODEM-FW, A-SISO-MULT-SB, A-SISO-SING-SB, and A-SISO-SING-NB. Simulations were run for $\sigma=2°$ and $B_{eq}$ was optimized for each $E_b/N_0$ value. Examining the CC performance curves, the following observations may be made. With perfect CSI, BER of $10^{-5}$ is achieved at $E_b/N_0$=3.75 dB. The PSP-based receiver operates at this BER with a loss of 0.4 dB, while the CA-MLSD receiver performs poorly resulting in a BER of $10^{-2}$ at 4 dB.

The design procedure outlined in the previous paragraphs was followed for the selection of $N_t$ for the SCCC case. Simulation trials not shown here suggested that a reasonable pair is ($N_t,N_d$)=(16,256) for a target BER of $10^{-5}$ and the mentioned phase dynamics. Observing the SCCC curves in FIG. 14 it may be concluded that A-SISO-MULT-SB and A-SISO-SING-SB (d=O) perform identically (0.6 dB away from the coherent case). This may be attributed to the fact that the former corresponds to an FSM of only 4 states. Therefore, there is no notable gain by using four PLLs instead of one PLL. This is to be contrasted with the 128-state CC case, where a large difference between the CA-MLSD and PSP-based decoders is observed. A small degradation of 0.2 dB is observed when binding is dropped in the A-SISO receiver. The A-SODEM receiver has very similar performance with the A-SISO-MULT-SB and A-SISOSING SB receivers, even though it corresponds to no apparent memory, while the simplified version A-SODEM-FW, results in a performance loss of 1 dB compared to the best adaptive receivers considered.

Regarding the performance of the proposed adaptive schemes, it may be noted that since the SNR loss due to the insertion of pilot symbols is $-10 \log_{10} R_r = 0.27$ dB, the actual loss due to the unknown phase is only 0.33 dB (for the best adaptive scheme, i.e., A-SISO-MULT/SINGSB). This means that even if the state space is increased (by using super-state-based ASIs), the expected performance gain is very small (at most 0.33 dB). As a result, in this particular application, the AS1 techniques built on the original state trellis suffice.

The comparison of the CC and SCCC curves illustrates the importance of adaptive iterative detection. Under perfect CSI, the SCCC performs with a 2.6 dB gain over the standard CC. This gain vanishes when a PSP based MLSD receiver is used to decode CC and the EXT receiver is used for SCCC. By utilizing the more advanced A-SISOs or A-SODEMs proposed here, together with pilot symbols, the corresponding gain is increased to 3 dB.

PCCC with Carrier Phase Tracking

In a PCCC, a length N block of the original sequence $x_k$ is encoded by a rate $R_1$ CC, while an interleaved version of the input sequence is encoded by a second CC of rate $R_2$, giving rise to the coded symbols $y_k^{(1)}$ and $y_k^{(2)}$, respectively. The output symbols $y_k^{(1)}$ and $y_k^{(2)}$ are then mapped to the symbols $q_k$ and transmitted over an AWGN channel which introduces phase uncertainty, modeled exactly as in the case of SCCCs. The mapping may be done after puncturing. The observation equation is written as $$z_k = \sqrt{E_s} f_k(y_k^{(1)}, y_k^{(2)}) e^{j\theta_k} + n_k = \sqrt{E_s} q_k e^{j\theta_k} + n_k \quad (29)$$

where the time-varying mapping $q_k = f_k(y_k^{(1)}, y_k^{(2)})$ is explicitly shown. Pilot symbols are inserted in the transmitted sequence in the same manner described in the previous section.

For concreteness, we consider the case where $y_k^{(1)} = (x_k, c_k^{(1)})$ includes a systematic and a coded bit ($R_1 = \frac{1}{2}$), $y_k^{(2)} = c_k^{(2)}$ is a binary coded bit ($R_2 = 1$) and $q_k$ belongs to a QPSK signal constellation. This signaling format, which was the basis for the original turbo code, may be achieved by transmitting the systematic bit $x_k$, together with the coded bits $c_k^{(1)}$ or $c_k^{(2)}$ after alternate puncturing.

$$q_k = f_k(y_k^{(1)}, y_k^{(2)}) = \begin{cases} QPSK(x_k, c_k^{(1)}) & k \text{ even} \\ QPSK(x_k, c_k^{(2)}) & k \text{ odd} \end{cases} \quad (30)$$

where QPSK(•, •) maps the bits to the two-dimensional QPSK signal constellation (e.g., using Gray mapping).

A. Receivers

Since PCCCs may be modeled as parallel concatenated FSMs, the iterative decoder shown in FIG. 1B may be applied when perfect CSI is present. The adaptive receiver having an external DD-PLL operating on the coded symbols $q_k$, followed by a non-adaptive turbo decoder, is a potential solution when knowledge of the phase offset is not available at the receiver. The A-SODEM-based receiver is shown in FIG. 1C. Finally, for the A-SISO-based receiver, contrary to the serially concatenated examples considered above, the PCCC has the property that the outputs of both FSMs are directly affected by the channel. Furthermore, the outputs of the constituent FSMs are coupled via the nonlinear mapping of equation (29). This makes the substitution of the perfect-CSI SISO by an A-SISO insufficient for performing adaptive iterative detection in this case. Thus, adaptive iterative detection for this PCCC application requires a method for evaluating transition metrics and updating phase estimates for each A-SISO. One specific approach to the method is presented below.

Metric Evaluation: Metric evaluation in A-SISO may be performed by treating the output symbols corresponding to CC2 as nuisance parameters and either averaging or maximizing over them. Since APP soft metrics are proven to be superior compared to MSM ones (for the particular application in the perfect CSI case), averaging over the output symbols of CC2 seems to be a preferable choice. For example, the simplified transition metric used in equation is (26a) and in Appendix B for the forward recursion in SISO1 is evaluated as $$\gamma_k(t_k, \theta) = -\log \sum_{y_k^{(2)}} P(y_k^{(2)}) \exp\left(-\frac{|z_k - \sqrt{E_s} f_k(y_k^{(1)}, y_k^{(2)}) e^{j\theta}|^2}{N_0}\right) \quad (31)$$

where $y_k^{(1)}$ is an implicit function of $t_k$. A reasonable choice for the probability $P(y_k^{(2)})$ is to use the most recent soft-metrics produced by A-SISO2. This is identical to the operation of soft mapper (SOMAP) in the case of perfect CSI. The only difference is that the demodulator and the SOMAP are now integrated with the A-SISO1, since a phase estimate is required for this operation. This solution is both simple to implement, and compatible with the notion that SISO blocks exchange information only in the form of soft metrics. A similar procedure may be followed for the evaluation of the transition metrics of A-SIS02. Parameter Estimate Update: Several options are considered for updating the phase estimate in A-SISO.

Starting from the simplest solution, the channel update in A-SISO1 is only performed for those time instants k, for which the symbol $q_k$ is only a function of $Y_k^{(1)}$ (k is even). The resulting updates for this punctured DD-PLL become $$\tilde{\theta}_k = \begin{cases} \tilde{\theta}_{k-1} + \lambda \Im\{z_k QPSK(x_k, c_k^{(1)}) * e^{-j\tilde{\theta}_{k-1}}\} & k \text{ even} \\ \tilde{\theta}_{k-1} & k \text{ odd} \end{cases} \quad (32)$$

Figure 15:
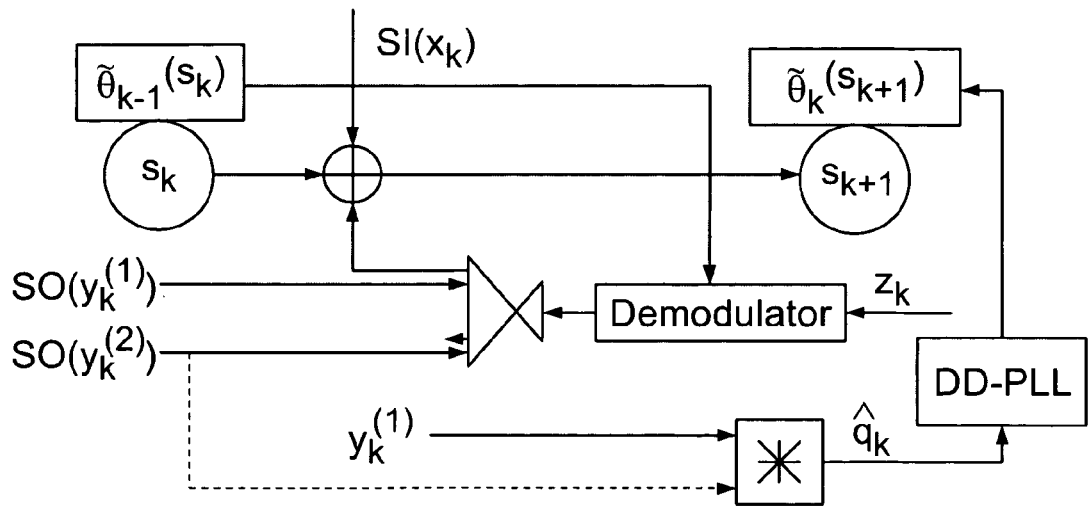
FIG. 15 shows metric and parameter update for A-SISO in the forward direction for the case of multiple parameter estimation.

A block diagram of the operations required to complete one step in the trellis is shown in FIG. 15. In particular, the transition from state $s_k$ to $s_{k+1}$ is shown, for the forward recursion of A-SISO1, where multiple estimators (one per each FSM state) are assumed. For the phase estimate update, an estimate $\tilde{q}_k$ of the raw symbol $q_k$ is required for the DD-PLL, and is obtained by utilizing information about $x_k$, $c_k^{(1)}$ and $c_k^{(2)}$. In the case of punctured DD-PLL, only $x_k$ and $c_k^{(1)}$ are required (as shown in equation (32)), and are completely specified by the state transition $t_k$. The immediate consequence of this sort of channel update is a loss of the full tracking ability of the estimator (i.e., the effective loop bandwidth is halved). In addition, such an approach is not always applicable, since the mapping $f_k(\cdot)$ may always be an explicit function of the symbol $c_k^{(2)}$, as in the case of non-punctured codes.

In a more refined technique, the channel estimator—and in particular the DD-PLL (or DD-PLLs)—is updated for every time instant k. Referring to FIG. 15, as in the previous case, $x_k$ and $c_k^{(1)}$ are determined by the state transition of A-SISO1, while an estimate $\tilde{c}_k^{(2)}$ of $c_k^{(2)}$ is determined by hard quantizing the most recent soft information of $c_k^{(2)}$ available either from A-SISO2 or from any other soft block in the adaptive receiver.

The resulting updates for this parallel DD-PLL become $$\tilde{\theta}_k = \begin{cases} \tilde{\theta}_{k-1} + \lambda \Im\{z_k QPSK(x_k, c_k^{(1)}) * e^{-j\tilde{\theta}_{k-1}}\} & k \text{ even} \\ \tilde{\theta}_{k-1} + \lambda \Im\{z_k QPSK(x_k, \tilde{c}_k^{(2)}) * e^{-j\tilde{\theta}_{k-1}}\} & k \text{ odd} \end{cases} \quad (33)$$

Finally, an even more sophisticated technique may be derived by utilizing a mixed-mode PLL. Such a PLL operates in a decision directed mode in terms of the symbol $y_k^{(1)} = (x_k, c_k^{(1)})$, while it effectively averages out the symbol $c_k^{(2)}$. Hybrid schemes that use a punctured PLL initially and switch to a parallel decision-directed operation are also possible.

Figure 1D:
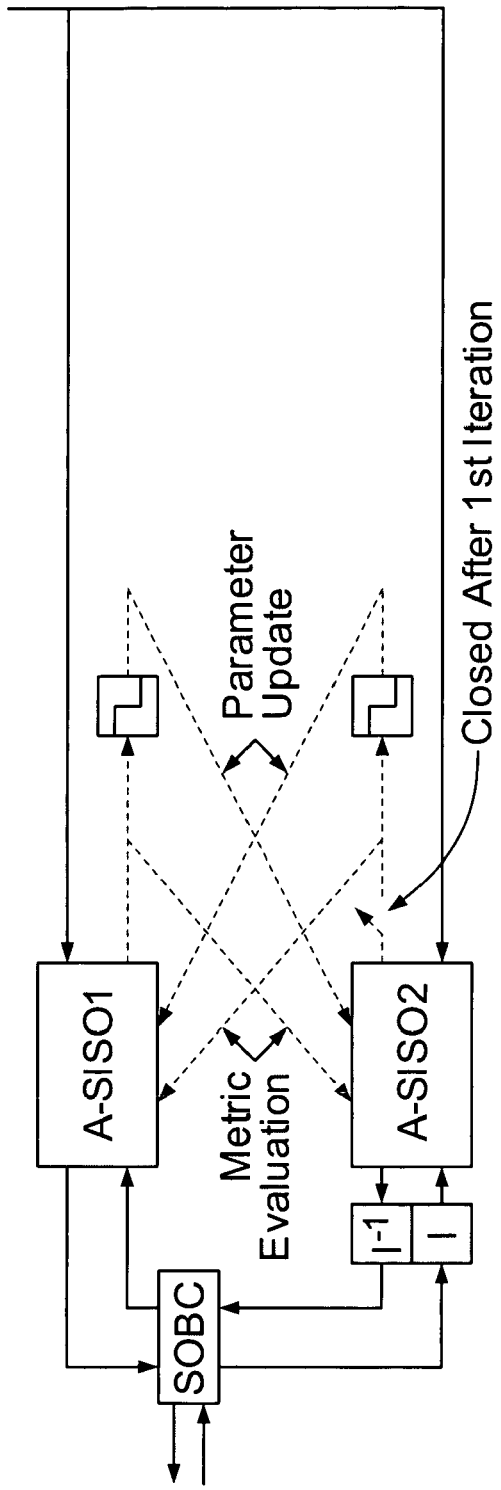
FIG. 1D is an A-SISO-based iterative receiver.

In the following, the first order DD-PLL and sub-optimal binding term in equations (25) and (26c) will be used. Transition metrics are evaluated by averaging out the symbols corresponding to the other FSM as described in equation (31). Finally, a hybrid approach for phase tracking is used. Specifically, A-SISO1 is run with the punctured DD-PLL of equation (32) on the initial iteration, and switches to the parallel decision-directed mode of equation (33) in the subsequent iterations. The rational behind this hybrid bootstrapping procedure is that in the first iteration, there are no soft (or hard) decisions available for the symbol $Y_k^{(2)}$. The activation schedule for the iterative detector is shown in FIG. 1D and described as follows: A-SISO1 (with internal SOMAP and demodulator)->SOBC (which effectively forwards extrinsic information form A-SISO1 to A-SISO2)-> A-SISO2 (with corresponding internal SOMAP and demodulator)->SOBC in the opposite direction->A-SISO1, etc.

B. Numerical Results

An overall rate R=1 code is considered in this section, constructed by concatenating two identical 4-state Recursive Systematic convolutional Codes (RSC), and using a size N=16384 pseudorandom interleaver. Both the systematic and the encoded bits are output from the first code, while only the encoded bit is output from the second. The corresponding generator matrices are given by $$G_1(D) = \left[1 \frac{1+D^2}{1+D+D^2}\right] G_2(D) = \frac{1+D^2}{1+D+D^2}$$

Figure 16:
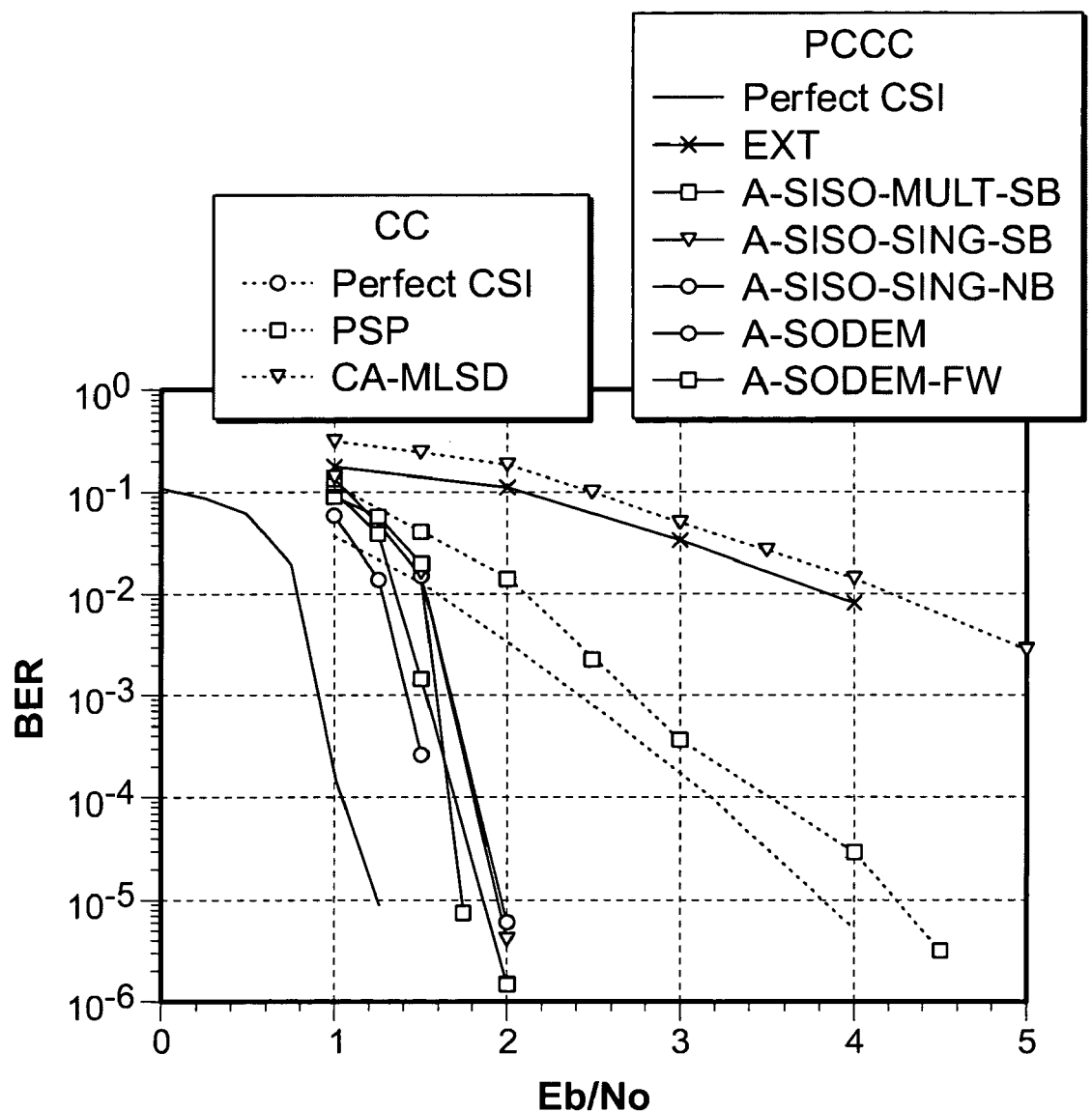
FIG. 16 is a plot of BER vs. $E_b/N_o$ PCCC with phase dynamics and various inner A-SISO and A-SODEM configurations (the optimal performance for SING receivers was achieved for d=0).

The output symbol is formed as described in equation (12). In FIG. 16, performance curves similar to those of FIG. 14 are presented. The conclusions are similar to the SCCC case, with the only difference being the slight degradation of the A-SISO-SING-SB and A-SISO-SING-NB techniques over the A-SISO-MULT-SB receivers. In addition, the A-SODEM-FW performance is very close to the performance of the A-SISO-based receivers, and the A SODEM technique results in slightly better performance compared to A-SISOs. Also, as in the case of perfect CSI, the quantitative performance achieved using the SCCC and PCCC systems is very similar. Finally, simulations for the case of static phase revealed comparable performance with that shown in FIG. 13.

CONCLUSION

Iterative detection may be viewed as the exchange of soft information between "soft inverses" of each subsystem in the concatenated network, which combine and marginalize this information. In one aspect of the present disclosure, the soft inverse of a system with parametric uncertainty present was developed. The adaptive soft inverse of an FSM (i.e., the A-SISO) was the particular focus. It was demonstrated how an A-SISO may be used to perform AID with numerical results given for the TCM-ISI serially concatenated system. It was found that qualitative conclusions regarding performance (e.g., the iteration gain) are substantially different for the case with parametric uncertainty. In particular, iteration gains for the time-varying fading channel were considerably larger than the perfect CSI case.

By deriving the techniques starting from a reasonable definition for soft outputs, several classes of practical adaptive forward-backward techniques were obtained. The resulting set of practical techniques is intuitive combinations of forward/backward SISOs for perfect CSI and adaptive hard-decision techniques. Thus, several similar approaches may be suggested based on existing hard-decision techniques and/or SISO architectures. For example, the class of techniques for the linear Gaussian fading channel that utilize steady-state finite-memory estimators may readily be adapted to a forward-backward SISO using the framework developed (i.e., the binding term). Similarly, generalization of AID to other activation schedules and architectures (i.e., FL SISOs, parallel message passing architectures, etc.) may be envisioned.

For the detection of turbo codes (i.e., SCCCs and PCCCs) and phase tracking for the practical scenarios examined, it was shown that pilot-symbol-assisted adaptive iterative detection is effective for maintaining the near-Shannon-limit performance previously demonstrated for known phase systems. Incorporating the estimation process into the ID process gives advantages similar to those documented in adaptive hard decision literature, where joint estimation and data detection is considered for an isolated system (e.g., PSP-based phase tracking yields a factor of 2–3 in loop bandwidth extension for trellis-codes).

It may be possible to construct a more efficient SCCC using a QPSK constellation (e.g., by puncturing the outer and/or inner code). In fact, for a channel utilization of 1 bit per channel use at low $E_b/N_0$, a QPSK constellation is adequate for achieving capacity. Also, potential further improvement for the SCCC may be achieved by the development of rotationally invariant possibly multidimensional-inner codes. The use of such codes may alleviate the detrimental effects of cycle slipping, potentially enabling even wider loop bandwidths.

Decoding of PCCCs with phase tracking reveals that the concept of adaptive iterative detection is broader than the concept of ASI techniques (A-SISOs or A-SODEMs). Although practical receivers were proposed based on the latter structures, the development of a general framework for adaptive iterative detection on arbitrary networks based on the theoretical framework is an area for future research.

While specific embodiments of the invention have been illustrated and described, other embodiments and variations are possible.

All these are intended to be encompassed by the following claims.

What is claimed is:

1. A system for estimating inputs and outputs of a digital transmission system, comprising:
   a receiver front-end configured to receive a digital signal in the digital transmission system as an observed digital signal;
   a forward recursion element adapted to receive the observed digital signal, and generate a first sequence of soft information by performing a forward recursion;
   at least one forward channel estimator adapted to receive the observed digital signal and said first sequence of soft information, said at least one forward channel estimator operating to estimate forward channel parameters using said first sequence of soft information;

a backward recursion element adapted to receive the observed digital signal, and generate a second sequence of soft information by performing a backward recursion;

at least one backward channel estimator adapted to receive the observed digital signal and said second sequence of soft information, said at least one backward channel estimator operating to estimate backward channel parameters using said second sequence of soft information; and a combiner configured to compute a transitional information that binds the forward channel parameter estimates with the backward channel parameter estimates, said combiner operating to generate soft information for the digital transmission system by combining said first and second sequences of soft information and said transitional information.

2. The system of claim 1, wherein said forward recursion element is a Trellis-based forward operator, and said backward recursion element is a Trellis-based backward operator, where each operator generates a sequence of Trellis state soft information updates.

3. The system of claim 2, wherein each of said Trellis-based forward operator and backward operator is a min/sum operator.

4. The system of claim 3, wherein each of said min/sum operators performs min/sum operations on said sequence of Trellis state soft information updates.

5. The system of claim 4, wherein each of said min/sum operators computes soft outputs defined by Trellis state transitions.

6. The system of claim 5, wherein said soft outputs defined by Trellis state transitions are computed by min/sum operations of a starting state forward soft information, said Trellis state transition, an ending state backward soft information, and a binding factor.

7. The system of claim 2, wherein each of said Trellis-based forward and backward operators is a sum/product operator.

8. The system of claim 2, wherein each of said Trellis-based forward and backward operators is a min/product operator.

9. The system of claim 2, wherein each of said Trellis-based forward and backward operators is a max/product operator.

10. The system of claim 2, wherein each of said Trellis-based forward operator and backward operator is a min*/sum operator.

11. The system of claim 2, wherein each of said forward and backward operators includes at least one Kalman filter channel estimator.

12. The system of claim 2, wherein each of said forward and backward operators includes at least one least mean-square estimator.

13. The system of claim 2, wherein each of said forward and backward operators includes at least one non-linear estimator.

14. The system of claim 13, wherein said at least one non-linear estimator is a phase-locked loop.

15. The system of claim 2, wherein each of said forward and backward operators includes at least one open-loop estimator.

16. A method for estimating inputs and outputs of a digital transmission system, comprising:

receiving digital signal in the digital transmission system as an observed digital signal;

generating a first sequence of soft information by performing a forward recursion;

estimating forward channel parameters using said first sequence of soft information and said observed digital signal;

generating a second sequence of soft information by performing a backward recursion;

estimating backward channel parameters using said second sequence of soft information and said observed digital signal;

computing a transitional information that binds the forward channel parameter estimates with the backward channel parameter estimates; and generating soft information of the digital transmission system by combining said first and second sequences of soft information and said transitional information.

17. An iterative receiver system, comprising:

a channel processor configured to receive a plurality of coded symbols, said channel processor operating to produce and update soft information on said plurality of coded symbols, where said channel processor is activated by soft information, updated by other soft-input/soft-output modules, on interleaved code symbols and wherein said channel processor operating to produce and update soft information performs the steps of:

generating a first sequence of soft information by performing a forward recursion on said plurality of coded symbols, estimating forward channel parameters using said first sequence of soft information and said plurality of coded symbols, generating a second sequence of soft information by performing a backward recursion on said plurality of coded symbols, estimating backward channel parameters using said second sequence of soft information and said plurality of coded symbols, computing a transitional information that binds the forward channel parameter estimates with the backward channel parameter estimates, and generating soft information on said plurality of coded symbols by combining said first and second sequences of soft information and said transitional information.

18. The system of claim 1, wherein said combiner configured to compute said transitional information that binds the forward channel parameter estimates with the backward channel parameter estimates comprises said combiner configured to compute said transitional information that binds said first and second sequences of soft information and said forward and backward channel parameter estimates.

19. The system of claim 1, wherein said combiner operating to generate soft information for the digital transmission system comprises said combiner operating to generate soft information on the inputs and outputs of the digital transmission system.

* * * * *

UNITED STATES PATENT AND TRADEMARK OFFICE
CERTIFICATE OF CORRECTION

| | |
|---|---|
| PATENT NO. | : 7,092,457 B2 |
| APPLICATION NO. | : 09/765516 |
| DATED | : August 15, 2006 |
| INVENTOR(S) | : Keith M. Chugg and Achilleas Anastasopoulos |

It is certified that error appears in the above-identified patent and that said Letters Patent is hereby corrected as shown below:

Column 1, line 10, insert the following paragraph:
-- FEDERALLY SPONSORED RESEARCH OR DEVELOPMENT
This invention was made with government support under Contract No. 9726391 awarded by the National Science Foundation. The government has certain rights in the invention. --;

Signed and Sealed this

Twenty-seventh Day of January, 2009

JOHN DOLL
*Acting Director of the United States Patent and Trademark Office*